(12) United States Patent
Gu et al.

(10) Patent No.: US 11,862,981 B2
(45) Date of Patent: Jan. 2, 2024

(54) PHOTOVOLTAIC SYSTEM AND CONTROL METHOD

(71) Applicant: HUAWEI DIGITAL POWER TECHNOLOGIES CO., LTD., Shenzhen (CN)

(72) Inventors: Guilei Gu, Shanghai (CN); Peixian Jia, Xi'an (CN)

(73) Assignee: HUAWEI DIGITAL POWER TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/851,374

(22) Filed: Jun. 28, 2022

(65) Prior Publication Data

US 2022/0416546 A1    Dec. 29, 2022

Related U.S. Application Data

(63) Continuation-in-part of application No. 17/696,596, filed on Mar. 16, 2022, which is a continuation of
(Continued)

(30) Foreign Application Priority Data

Jun. 29, 2021   (CN) .......................... 202110731302.6

(51) Int. Cl.
    *H02J 3/38*    (2006.01)
    *H02J 3/46*    (2006.01)

(52) U.S. Cl.
    CPC .............. *H02J 3/381* (2013.01); *H02J 3/46* (2013.01); *H02J 2300/26* (2020.01)

(58) Field of Classification Search
    CPC .. H02J 3/381; H02J 3/382; H02J 3/383; H02J 3/385; H02J 3/46; H02J 2300/22; H02J 2300/24; H02J 2300/26
(Continued)

(56) References Cited

U.S. PATENT DOCUMENTS

2012/0126629 A1* 5/2012 Georgi ..................... H02H 3/24
                                                              307/86
2016/0380436 A1   12/2016 Porter et al.
(Continued)

FOREIGN PATENT DOCUMENTS

CN    104011873 A    8/2014
CN    107508463 A    12/2017
(Continued)

OTHER PUBLICATIONS

Extended European Search Report issued in European Application No. 22181420.5 dated Nov. 24, 2022.
(Continued)

*Primary Examiner* — Hal Kaplan

(57) ABSTRACT

A photovoltaic system includes an inverter, a controller, and at least two converters. An input terminal of each of the at least two converters are connected to a corresponding photovoltaic module, and output terminals of the at least two converters are connected in series and connected to an input terminal of the inverter. The controller is configured to set a voltage limiting value of at least one of the at least two converters, so that an output voltage of the at least one converter is less than or equal to the voltage limiting value when the converter works in a voltage limiting mode. The voltage limiting value of the at least one converter is proportional to an open circuit voltage of the photovoltaic module connected to an input terminal of the converter. Open circuit voltages of different photovoltaic modules vary with different parameters or models of the photovoltaic modules.

19 Claims, 9 Drawing Sheets

Related U.S. Application Data application No. PCT/CN2020/096888, filed on Jun. 18, 2020.

(58) Field of Classification Search
USPC .......................................................... 307/82
See application file for complete search history.

(56) References Cited

U.S. PATENT DOCUMENTS

2019/0131793 A1   5/2019   Wang et al.
2020/0159269 A1   5/2020   Gao et al.

FOREIGN PATENT DOCUMENTS

| CN | 109066847 A | 12/2018 |
| CN | 109802556 B | 1/2021 |
| EP | 3965278 A1 | 3/2022 |
| JP | 2010061495 A | 3/2010 |

OTHER PUBLICATIONS

Chinese Office Action issued in Chinese Application No. 202110731302.6 dated Jun. 25, 2023.

\* cited by examiner

PHOTOVOLTAIC SYSTEM AND CONTROL METHOD

CROSS-REFERENCE TO RELATED APPLICATION

This application claims priority to Chinese Patent Application No. 202110731302.6, filed on Jun. 29, 2021, which is hereby incorporated by reference in its entirety.

TECHNICAL FIELD

This application relates to the field of photovoltaic power generation technologies, and in particular, to a photovoltaic system and a control method.

BACKGROUND

At present, with the worsening of the global energy shortage and environmental pollution, photovoltaic power generation is increasingly widely applied. In photovoltaic power generation, a direct current generated by a photovoltaic module e.g., based on exposure to solar radiation, is converted into an alternating current by using an inverter, and the alternating current is connected to an alternating current power grid or is provided for a load. Such well known photovoltaic modules convert sunlight into electrical energy. A single PV device known as a cell is usually small, typically producing about 1 or 2 watts of power. These cells are made of different semiconductor materials. To boost the power output of PV cells, they are connected together in chains to form larger units known as modules or panels. Modules can be used individually, or several can be connected to form arrays. One or more arrays is then connected to the electrical grid as part of a complete PV system. PV systems also include components that take the direct-current (DC) electricity produced by photovoltaic modules and convert it to alternating-current (AC) electricity used to power common appliances and/or apply to the power grid.

A voltage and a current output by a single photovoltaic module are limited. To obtain a high output voltage or output current, a plurality of photovoltaic modules are usually connected in series and in parallel to form a photovoltaic array. Generally, parameter discreteness of the photovoltaic modules and/or differences in solar radiation may cause mismatches in series and parallel connected photovoltaic modules. To resolve the series mismatch and parallel mismatch of the photovoltaic modules, each photovoltaic module is connected to a converter with a maximum power point tracking (Maximum Power Point Tracking, MPPT) function, and output terminals of the converters are connected in series to form a photovoltaic string. Each photovoltaic string is connected to an input terminal of the inverter.

The photovoltaic module is configured with the converter, and the converter can limit the output voltage. In this case, configuring the photovoltaic module is more flexible, and a quantity of photovoltaic modules that can be connected in series in a single photovoltaic string can be larger. However, when the converter limits the output voltage, conversion efficiency of the converter is reduce. Therefore, an input voltage of the inverter needs to be within an allowable range to avoid power off due to overvoltage protection, and conversion efficiency of the converter needs to be maximized.

SUMMARY

To resolve the foregoing technical problem, this application provides a photovoltaic system and a control method, to maximize conversion efficiency of a converter while ensuring that overvoltage of an inverter does not occur.

An embodiment of this application provides a photovoltaic system. The photovoltaic system includes an inverter, a controller, and at least two converters. An input terminal of each of the at least two converters are connected to a corresponding photovoltaic module, and output terminals of the at least two converters are connected in series and connected to an input terminal of the inverter. The controller is configured to set a voltage limiting value of at least one of the at least two converters, so that an output voltage of the at least one converter is less than or equal to the voltage limiting value when the converter works in a voltage limiting mode. The voltage limiting value of the at least one converter is proportional to an open circuit voltage of the photovoltaic module connected to an input terminal of the converter.

According to the technical solution provided in this embodiment of this application, different settings of voltage limiting values of converters are used, to make a voltage limiting value of a converter proportional to an open circuit voltage of a photovoltaic module corresponding to the converter. To be specific, when the open circuit voltage of the photovoltaic module connected to the converter is high, a corresponding voltage limiting value is high. When the open circuit voltage of the photovoltaic module connected to the converter is low, a corresponding voltage limiting value is low. In this way, for the voltage limiting value configured for each converter, the open circuit voltage of the photovoltaic module connected to the converter is fully considered, so that the converter works at high conversion efficiency. The technical solution is applicable not only to a case in which photovoltaic modules in a photovoltaic string have different models, but also to a case in which photovoltaic modules in the photovoltaic string have the same model. In addition, the technical solution provided in this embodiment of this application is applicable not only to a case in which quantities of photovoltaic modules included in a plurality of photovoltaic strings are the same, but also to a case in which quantities of photovoltaic modules included in a plurality of photovoltaic strings are different.

In a possible implementation, each photovoltaic string includes at least two converters. The controller is specifically configured to set a voltage limiting value based on the preset voltage and a sum of open circuit voltages of each photovoltaic string. The preset voltage is less than a maximum allowable input voltage of the inverter. The preset voltage closer to the maximum allowable input voltage indicates the higher conversion efficiency of the converter. The voltage limiting value of the at least one converter is inversely proportional to a sum of open circuit voltages of a photovoltaic string in which the converter is located. The sum of open circuit voltages of the photovoltaic string refers to a sum of open circuit voltages of all photovoltaic modules in the photovoltaic string.

In the photovoltaic system provided in this embodiment of this application, a voltage limiting value of each converter is no longer restricted to being set to a fixed value. The voltage limiting value of each converter is variable and depends on an open circuit voltage of a photovoltaic module connected to the converter, and also depends on a sum of open circuit voltages of a photovoltaic string in which the converter is located. In this way, for the voltage limiting value configured for each converter, the open circuit voltage of the photovoltaic module connected to the converter is fully considered, so that the converter works at high conversion efficiency. For example, for a same photovoltaic string, a photovoltaic module with a high open circuit voltage corresponds to a high voltage limiting value of a converter, and a photovoltaic module with a low open circuit voltage corresponds to a low voltage limiting value of a converter. Voltage limiting values of converters in a same photovoltaic string vary with different parameters of photovoltaic modules. This helps improve conversion efficiency of the converters.

In a possible implementation, the controller is specifically configured to obtain a limiting proportion of each photovoltaic string by using a ratio of the preset voltage to the sum of open circuit voltages of each photovoltaic string. At least one converter in each photovoltaic string uses a product of an input voltage of the converter and the limiting proportion as the voltage limiting value. An input voltage of each converter can be obtained, and is a voltage of a photovoltaic module connected to an input of the converter. Input voltages of converters vary with different parameters of the converters. Even if limiting proportions of the converters are the same, voltage limiting values corresponding to the converters are different. Different photovoltaic strings may correspond to different limiting proportions, because the sum of open circuit voltages of each photovoltaic string is different, and a limiting proportion is proportional to a preset voltage, and is inversely proportional to the sum of open circuit voltages of a photovoltaic string. This is expressed by using a formula as follows: Limiting proportion=Preset voltage/Sum of open circuit voltages of a photovoltaic string.

In the photovoltaic system provided in this embodiment of this application, not only an open circuit voltage of a corresponding photovoltaic module, but also a sum of open circuit voltages of a photovoltaic string in which the converter is located are considered for a voltage limiting value of each converter. Therefore, the voltage limiting value is proportional to the open circuit voltage of the photovoltaic module so that the converter can maximize conversion efficiency, and the voltage limiting value is set to be as large as possible. In addition, the voltage limiting value is inversely proportional to the sum of open circuit voltages of the photovoltaic string, so that the voltage obtained by connecting the converters in series does not exceed the maximum allowable voltage value of the inverter.

In a possible implementation, the plurality of photovoltaic strings include a first photovoltaic string and a second photovoltaic string. The controller is specifically configured to send a limiting proportion of the first photovoltaic string to at least one converter in the first photovoltaic string through power line communication, and send a limiting proportion of the second photovoltaic string to at least one converter in the second photovoltaic string, so that the at least one converter in the first photovoltaic string sets a corresponding voltage limiting value based on the limiting proportion of the first photovoltaic string, and the at least one converter in the second photovoltaic string sets a corresponding voltage limiting value based on the limiting proportion of the second photovoltaic string.

In a possible implementation, the controller is further configured to: when the inverter works abnormally, send a modification coefficient to at least one converter in each photovoltaic string in a multicast manner, where the modification coefficient is used for reducing the voltage limiting value, and the modification coefficient is less than 1.

The foregoing working status of the inverter may be that the inverter works abnormally. For example, a working abnormality is that a temperature of the inverter exceeds a preset threshold. Specifically, a temperature sensor may be disposed inside a cabinet of the inverter. When the temperature measured by the temperature sensor exceeds the preset threshold, the controller may send a modification coefficient to at least one converter in each photovoltaic string in a multicast manner, where the modification coefficient is used for reducing the voltage limiting value. When the inverter is connected to the grid for power generation, and the inverter is derated due to overtemperature because of some reason(s), for example, because an input voltage of the inverter is high, the input voltage of the inverter needs to be reduced so that the inverter is not derated due to overtemperature.

In a possible implementation, the converter includes a buck circuit. The converter is configured to obtain an output PV curve of the converter based on a PV curve of the connected photovoltaic module and a corresponding voltage limiting value, and control an output voltage of the converter based on the output PV curve. Voltage limiting of the converter is implemented by simulating an output feature of the photovoltaic module, so that the converter can be equivalent to a photovoltaic module. In other words, from a perspective of the inverter, the photovoltaic module and the converter may be considered as a new photovoltaic module, so that an existing MPPT control policy of the inverter can be adapted when the output voltage of the converter is limited, and stability of the photovoltaic system can be ensured.

In a possible implementation, the controller is specifically configured to obtain the sum of open circuit voltages of each photovoltaic string based on a voltage ratio of the plurality of photovoltaic strings and an output voltage of each photovoltaic string; or the controller is specifically configured to obtain the sum of open circuit voltages of each photovoltaic string based on an open circuit voltage reported by a converter in the photovoltaic string.

In a possible implementation, the controller is specifically configured to send the voltage ratio and the limiting proportion to the corresponding photovoltaic string in a multicast manner.

In a possible implementation, the first photovoltaic string includes at least a first group of photovoltaic modules and a second group of photovoltaic modules. The second photovoltaic string includes at least a third group of photovoltaic modules and a fourth group of photovoltaic modules. Parameters of the first group of photovoltaic modules are different from parameters of the second group of photovoltaic modules. Parameters of the third group of photovoltaic modules are different from parameters of the fourth group of photovoltaic modules.

In a possible implementation, the plurality of photovoltaic strings include at least a first photovoltaic string and a second photovoltaic string, and a quantity of photovoltaic modules included in the first photovoltaic string and a quantity of photovoltaic modules included in the second photovoltaic string are different.

In a possible implementation, the controller is integrated into a cabinet of the inverter.

Based on the photovoltaic system provided in the foregoing embodiments, an embodiment of this application further provides a photovoltaic system control method. The photovoltaic system includes an inverter, a controller, and at least two converters. Output terminals of the at least two converters are connected in series and connected to an input terminal of the inverter. Each photovoltaic string corresponds to the at least two converters. An input terminal of each of the at least two converters is connected to a corresponding photovoltaic module. The method includes: setting a voltage limiting value of at least one corresponding converter of the at least two converters, so that an output voltage of the at least one converter is less than or equal to the voltage limiting value when the converter works in a voltage limiting mode, where the voltage limiting value of the at least one converter is proportional to an open circuit voltage of a photovoltaic module connected to an input terminal of the converter, and is inversely proportional to a sum of open circuit voltages of a photovoltaic string in which the converter is located. Advantages of the foregoing photovoltaic system embodiment are also applicable to the control method. Details are not described herein again.

In a possible implementation, each photovoltaic string includes at least two converters; and the setting a voltage limiting value of at least one corresponding converter of the at least two converters specifically includes: setting the voltage limiting value based on a preset voltage and a sum of open circuit voltages of each photovoltaic string, where the preset voltage is less than a maximum allowable input voltage of the inverter.

In a possible implementation, the setting the voltage limiting value based on a preset voltage and a sum of open circuit voltages of each photovoltaic string specifically includes: obtaining a limiting proportion of each photovoltaic string by using a ratio of the preset voltage to the sum of open circuit voltages of each photovoltaic string, so that at least one converter in each photovoltaic string uses a product of an input voltage of the converter and the limiting proportion as the voltage limiting value.

In a possible implementation, the obtaining a limiting proportion of each photovoltaic string based on the preset voltage and the sum of open circuit voltages of each photovoltaic string, so that at least one converter in each photovoltaic string sets the voltage limiting value based on the limiting proportion of the at least one converter in each photovoltaic string, specifically includes: sending a limiting proportion of the first photovoltaic string to at least one converter in the first photovoltaic string through power line communication, and sending a limiting proportion of the second photovoltaic string to at least one converter in the second photovoltaic string, so that the at least one converter in the first photovoltaic string sets a corresponding voltage limiting value based on the limiting proportion of the first photovoltaic string, and the at least one converter in the second photovoltaic string sets a corresponding voltage limiting value based on the limiting proportion of the second photovoltaic string.

In a possible implementation, the method further includes: when the inverter works abnormally, sending a modification coefficient to at least one converter in each photovoltaic string in a multicast manner, where the modification coefficient is used for reducing the voltage limiting value, and the modification coefficient is less than 1.

In a possible implementation, the method further includes: obtaining the sum of open circuit voltages of each photovoltaic string based on a voltage ratio of the plurality of photovoltaic strings and an output voltage of each photovoltaic string; or obtaining the sum of open circuit voltages of each photovoltaic string based on an open circuit voltage reported by a converter in the photovoltaic string.

Specifically, that the inverter works abnormally may be that a temperature is abnormal. For example, when the temperature exceeds a preset threshold, a modification coefficient is sent to at least one converter in each photovoltaic string in a multicast manner, where the modification coefficient is used for reducing the voltage limiting value, and the modification coefficient is less than 1. The temperature may be obtained by using a temperature sensor, and the temperature sensor may be located inside a cabinet of the inverter.

In another case, the controller directly corrects the limiting proportion corresponding to each photovoltaic string based on the modification coefficient, sends the corrected limiting proportion to each photovoltaic string in a multicast manner, and after receiving the corrected limiting proportion, the converter in each photovoltaic string recalculates the voltage limiting value. The control output voltage is obtained based on a recalculated voltage limiting value. Modification coefficients of different photovoltaic strings may be the same or different.

This application has at least the following advantages:

In the photovoltaic system provided in this embodiment of this application, the voltage limiting value of each converter is no longer restricted to being set to a fixed value, and the voltage limiting value of each converter depends on the open circuit voltage of the photovoltaic module connected to the converter. In this way, the open circuit voltage of the photovoltaic module connected to the converter is fully considered during setting the voltage limiting value of each converter. Open circuit voltages of different photovoltaic modules vary with different parameters or models of the photovoltaic modules, and the voltage limiting values of the converters connected to the photovoltaic module are different. In this way, an output limiting voltage of the converter is closely related to the photovoltaic module connected to the converter, and the converter works at high conversion efficiency. For example, for a same photovoltaic string, a photovoltaic module with a high open circuit voltage corresponds to a high voltage limiting value of a converter, and a photovoltaic module with a low open circuit voltage corresponds to a low voltage limiting value of a converter. Voltage limiting values of converters in a same photovoltaic string vary with different parameters of photovoltaic modules. This helps improve conversion efficiency of the converters.

DESCRIPTION OF EMBODIMENTS

Figure 1:
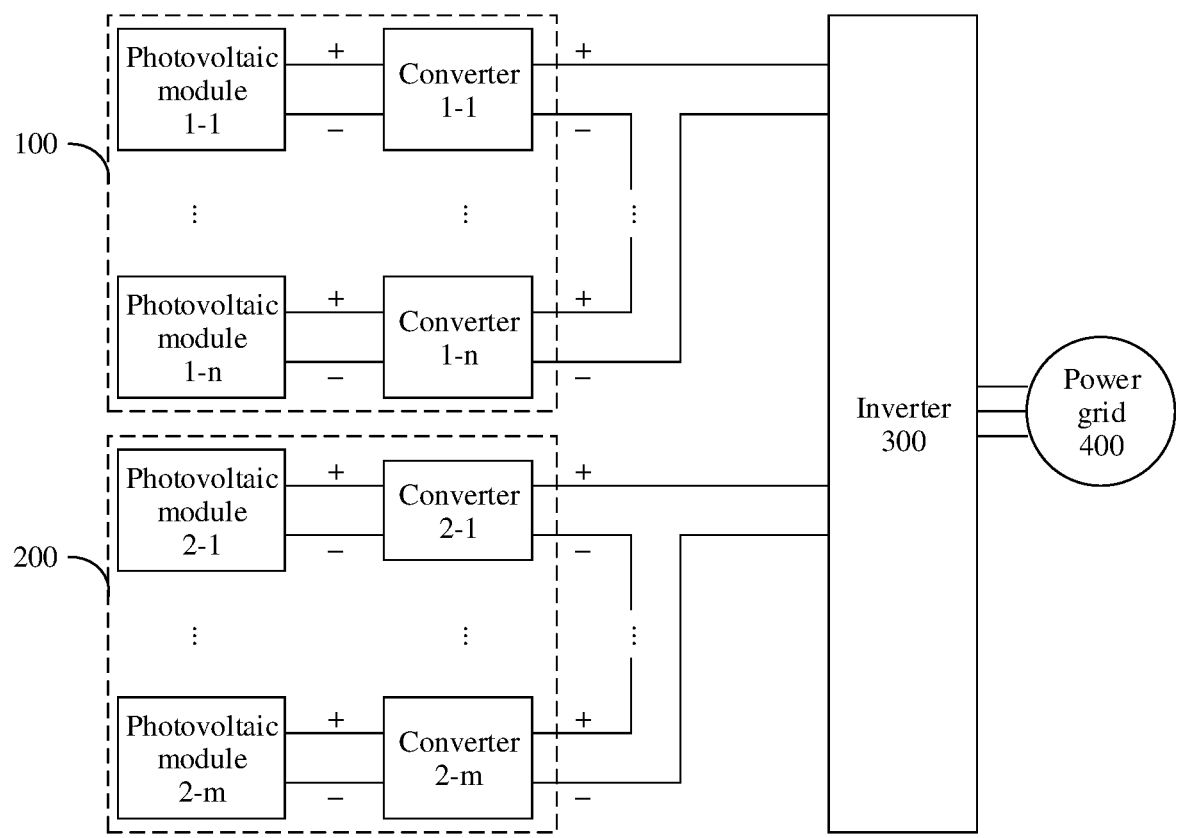
FIG. 1 is a schematic diagram of a photovoltaic system according to an embodiment of this application.

The following describes technical solutions in embodiments of this application with reference to accompanying drawings in embodiments of this application.

The following terms "first", "second", and the like are merely intended for a purpose of description, and shall not be understood as an indication or implication of relative importance or implicit indication of a quantity of indicated technical features. Therefore, a feature limited by "first", "second", or the like may explicitly or implicitly include one or more features. In the descriptions of this application, unless otherwise specified, "a plurality of" means two or more than two.

In this application, it should be noted that the term "connection" should be understood in a broad sense unless otherwise expressly specified and limited. For example, the "connection" may be a fixed connection, may be a detachable connection, may be an integral connection; may be a direct connection, or may be an indirect connection implemented by using a medium. In addition, the term "coupled" may be a manner of implementing an electrical connection for signal transmission. The "coupling" may be a direct electrical connection, or may be an indirect electrical connection through an intermediate medium.

To enable a person skilled in the art to better understand the technical solutions provided in embodiments of this application, the following first describes an application scenario of the technical solutions with reference to the accompanying drawings.

Photovoltaic System Embodiment

Embodiments of this application relate to a photovoltaic system. Generally, the photovoltaic system includes an inverter and a plurality of photovoltaic strings. The plurality of photovoltaic strings are connected to an input terminal of the inverter, and the photovoltaic string includes a plurality of photovoltaic modules. To more flexibly configure the photovoltaic modules in the photovoltaic string, a converter may be connected to each photovoltaic module. To be specific, an input terminal of a converter is connected to a corresponding photovoltaic module, and a voltage of the photovoltaic module is an input voltage of the converter. The converter can adjust the input voltage of the converter to adjust the voltage of the photovoltaic module. Generally, the converter is a direct current/direct current DC/DC (Direct Current/Direct Current) converter. The DC/DC converter may include a boost circuit, a buck circuit, or a buck-boost circuit. In this embodiment of this application, an example in which the converter is a buck circuit is used for description. Generally, a converter is also referred to as an optimizer in a photovoltaic system.

Working states of the converter are classified into two working modes: a maximum power point tracking (maximum power point tracking, MPPT) mode and an output voltage limiting mode.

MPPT mode: In normal cases, the converter only controls the input voltage to work at a maximum power point voltage (Maximum Power Point Voltage, Vmpp) of the photovoltaic module to achieve a maximum output power of the photovoltaic module, and does not control an output voltage.

Voltage limiting mode: In some scenarios, for example, the inverter shuts down, an output power of the inverter is limited, or the inverter is not connected to a load, the converter only controls an output voltage to be at a voltage limiting value, and does not control an input voltage. The actual input voltage works at a point that deviates from a Vmpp of the photovoltaic module.

It should be understood that the MPPT mode and the voltage limiting mode of the converter are two mutually exclusive working modes. The converter is allowed to switch between the two modes, but the converter can work only in one mode at a time.

Because the converter sometimes needs to work in the voltage limiting mode, the converter needs to limit the output voltage, in other words, the output voltage of the converter is set to the voltage limiting value. In the conventional technology, the voltage limiting value is usually set to a fixed value and cannot be changed, and a quantity of converters in the photovoltaic string needs to be set based on the fixed voltage limiting value. For example, a voltage limiting value of each converter is 30 V. If a maximum allowable input voltage of the inverter is 600 V, an upper limit of a quantity of converters connected in series in the photovoltaic string is 600 V/30 V=20. In this case, when the quantity of converters in the photovoltaic string is small, the converters, because of the voltage limiting value, still work in a buck mode, and conversion efficiency is low. In addition, in the conventional technology, a manner in which a voltage limiting value of each converter is set based on a quantity of converters connected in series is further provided. For example, if a quantity of converters in the photovoltaic string is 15, and a maximum allowable input voltage of the inverter is 600 V, the voltage limiting value of each converter is 600 V/15=40 V. However, this manner is applicable to a case in which all the photovoltaic modules in the photovoltaic string are the same model. If the photovoltaic modules in the photovoltaic string include different models, a converter with a high open circuit voltage and a converter with a low open circuit voltage correspond to a same voltage limiting value, and therefore conversion efficiency of the converter with the high open circuit voltage is low.

Therefore, in embodiments of this application, to resolve a technical problem in the conventional technology that conversion efficiency of some converters is low because voltage limiting values of all the converters are the same, in the technical solutions provided in embodiments of this application, voltage limiting values of different converters can be set to different values, to make a voltage limiting value of a converter proportional to an open circuit voltage of a photovoltaic module corresponding to the converter. To be specific, when the open circuit voltage of the photovoltaic module connected to the converter is high, a corresponding voltage limiting value is high. When the open circuit voltage of the photovoltaic module connected to the converter is low, a corresponding voltage limiting value is low. The technical solution is applicable not only to a case in which photovoltaic modules in a photovoltaic string have different models, but also to a case in which photovoltaic modules in the photovoltaic string have the same model. In addition, the technical solutions provided in embodiments of this application are applicable not only to a case in which quantities of photovoltaic modules in a plurality of photovoltaic strings are the same, but also to a case in which quantities of photovoltaic modules in a plurality of photovoltaic strings are different.

The following describes architectures of a photovoltaic system with reference to accompanying drawings.

FIG. 1 is a schematic diagram of a photovoltaic system according to an embodiment of this application.

For ease of description, in this embodiment, an example in which a plurality of photovoltaic strings include at least a first photovoltaic string 100 and a second photovoltaic string 200 is used for description. In an actual product, an input terminal of an inverter 300 may be connected to more photovoltaic strings. The input terminal of the inverter 300 is not limited to being connected to two photovoltaic strings.

It can be seen from FIG. 1 that the first photovoltaic string 100 includes n photovoltaic modules, and the second photovoltaic string 200 includes m photovoltaic modules. Both m and n are integers greater than or equal to 2, and m and n may be different. To highlight advantages of the technical solutions provided in embodiments of this application, in this embodiment of this application, an example in which m and n are different integers is used for description. In other words, a quantity n of photovoltaic modules included in the first photovoltaic string 100 and a quantity m of photovoltaic modules included the second photovoltaic string 200 are different.

An input terminal of a converter 1-1 in the first photovoltaic string 100 is connected to a photovoltaic module 1-1. An input terminal of a converter 1-n is connected to a photovoltaic module 1-n. An output terminal of the converter 1-1 to an output terminal of the converter 1-n are connected in series and connected to the input terminal of the inverter 300.

Similarly, an input terminal of a converter 2-1 in the second photovoltaic string 200 is connected to a photovoltaic module 2-1. An input terminal of a converter 2-m is connected to a photovoltaic module 2-m. An output terminal of the converter 2-1 to an output terminal of the converter 2-m are connected in series and connected to the input terminal of the inverter 300.

The inverter 300 may include two stages, namely, a DC/DC circuit and a direct current/alternating current (DC/AC, Direct Current/Alternating Current) circuit. The inverter 300 may include a plurality of DC/DC circuits, and the plurality of DC/DC circuits are in a one-to-one correspondence with a plurality of photovoltaic strings. An output terminal of each photovoltaic string is connected to an input terminal of a corresponding DC/DC circuit, and output terminals of a plurality of DC/DC circuits are connected to an input terminal of the DC/AC circuit. In other words, the output terminals of the plurality of DC/DC circuits are connected in parallel and connected to the input terminal of the DC/AC circuit.

An output terminal of the inverter 300 is connected to a power grid 400. Generally, the inverter 300 is a three-phase inverter, and the power grid 400 is a three-phase alternating current power grid. Alternatively, the inverter 300 may be a single-phase inverter for household use, and a corresponding power grid 400 is an alternating current power grid for household use.

Figure 2:
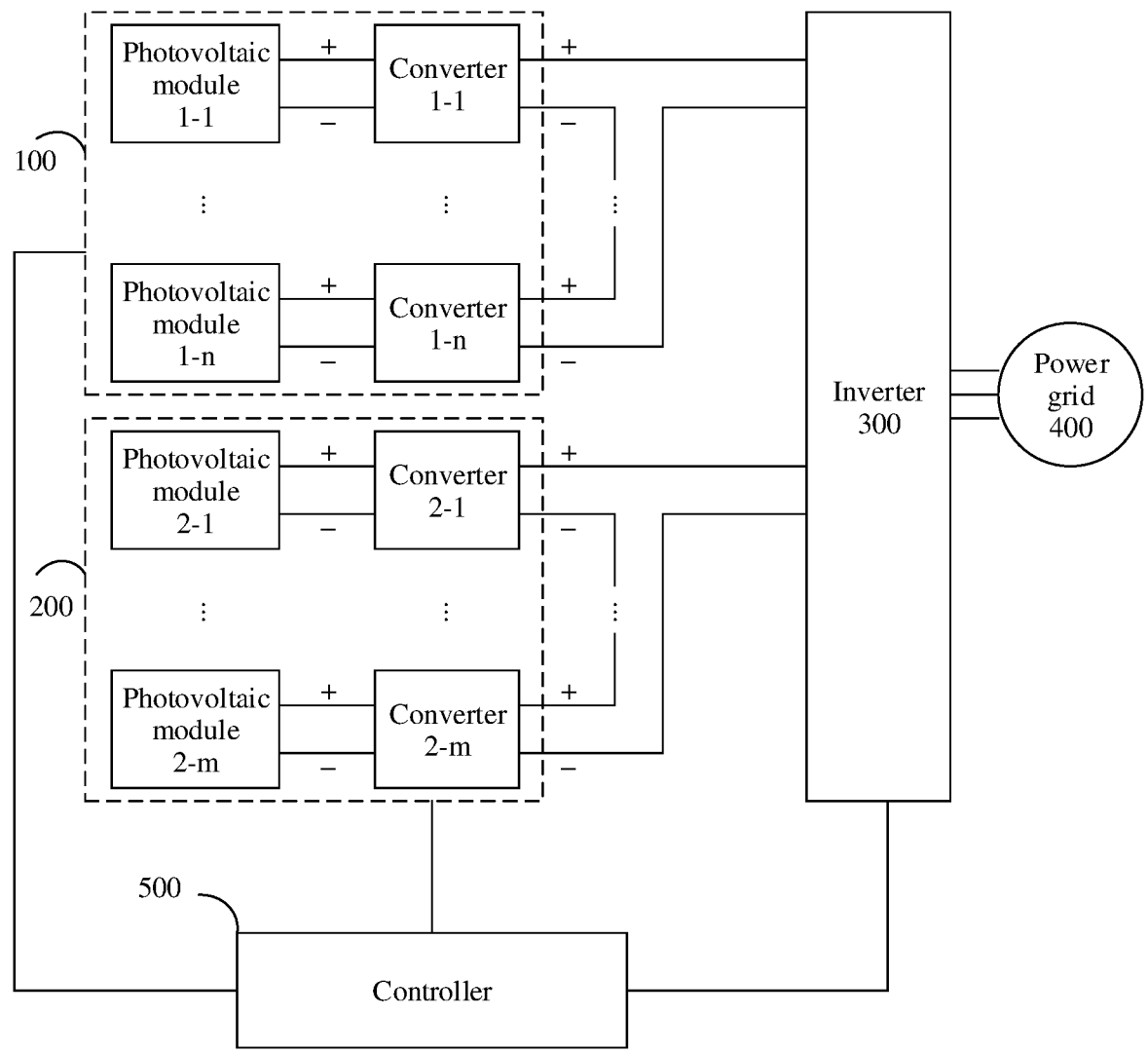
FIG. 2 is a schematic diagram of another photovoltaic system according to an embodiment of this application.

The following describes a photovoltaic system according to an embodiment of this application with reference to FIG. 2.

FIG. 2 is a schematic diagram of another photovoltaic system according to an embodiment of this application.

The photovoltaic system provided in this embodiment of this application includes an inverter 300, a controller 500, and at least two converters. An input terminal of each of the at least two converters is connected to a corresponding photovoltaic module. Output terminals of the at least two converters are connected in series and connected to an input terminal of the inverter.

Generally, each photovoltaic string corresponds to at least two converters, each photovoltaic string includes a plurality of photovoltaic strings and a plurality of converters. An input terminal of each converter is connected to a corresponding photovoltaic module. An input terminal of one converter may be connected to one photovoltaic module or a plurality of photovoltaic modules. This is not limited in this embodiment of this application. For ease of description, in FIG. 2, an example in which an input terminal of a converter is connected to one photovoltaic module is used for description.

It can be seen from FIG. 2 that a first photovoltaic string 100 includes n photovoltaic modules, and a second photovoltaic string 200 includes m photovoltaic modules. Both m and n are integers greater than or equal to 2, and m and n may be different. To highlight advantages of the technical solutions provided in embodiments of this application, in this embodiment of this application, an example in which m and n are different integers is used for description. In other words, a quantity n of photovoltaic modules included in the first photovoltaic string 100 and a quantity m of photovoltaic modules included the second photovoltaic string 200 are different.

An input terminal of a converter 1-1 in the first photovoltaic string 100 is connected to a photovoltaic module 1-1. An input terminal of a converter 1-n is connected to a photovoltaic module 1-n. An output terminal of the converter 1-1 to an output terminal of the converter 1-n are connected in series and connected to the input terminal of the inverter 300.

Similarly, an input terminal of a converter 2-1 in the second photovoltaic string 200 is connected to a photovoltaic module 2-1. An input terminal of a converter 2-m is connected to a photovoltaic module 2-m. An output terminal of the converter 2-1 to an output terminal of the converter 2-m are connected in series and connected to the input terminal of the inverter 300.

The controller 500 sets a voltage limiting value of at least one converter within the at least two converters in one photovoltaic string, so that the at least one converter works based on the voltage limiting value when working in the voltage limiting mode. The voltage limiting value of the at least one converter is proportional to an open circuit voltage of a photovoltaic module connected to the input terminal of the at least one converter, and is inversely proportional to a sum of open circuit voltages of the photovoltaic string in which the converter is located. The sum of open circuit voltages of the photovoltaic string is a sum of open circuit voltages of all photovoltaic modules in the photovoltaic string. For example, for the first photovoltaic string, the sum of open circuit voltages is a sum of open circuit voltages of the n photovoltaic modules 1-1 to 1-n.

For example, as shown in FIG. 2, a voltage limiting value of the converter 1-1 is proportional to the open circuit voltage of the photovoltaic module 1-1 connected to the input terminal of the converter 1-1 and is inversely proportional to a sum of open circuit voltages of the first photovoltaic string 100 in which the converter 1-1 is located. For the converter 2-1, a voltage limiting value of the converter 2-1 is proportional to the open circuit voltage of the photovoltaic module 2-1 connected to the input terminal of the converter 2-1, and is inversely proportional to a sum of open circuit voltages of the second photovoltaic string 200 in which the converter 2-1 is located.

It is clear that, in the photovoltaic system provided in this embodiment of this application, a voltage limiting value of each converter is no longer restricted to being set to a fixed value. The voltage limiting value of each converter depends on an open circuit voltage of a photovoltaic module connected to the converter, and also depends on a sum of open circuit voltages of a photovoltaic string in which the converter is located. In this way, for the voltage limiting value configured for each converter, the open circuit voltage of the photovoltaic module connected to the converter is fully considered, so that the converter works at high conversion efficiency. For example, for a same photovoltaic string, a photovoltaic module with a high open circuit voltage corresponds to a high voltage limiting value of a converter, and a photovoltaic module with a low open circuit voltage corresponds to a low voltage limiting value of a converter. Voltage limiting values of converters in a same photovoltaic string vary with different parameters of photovoltaic modules. This helps improve conversion efficiency of the converters.

The controller in the photovoltaic system provided in this embodiment of this application may be independently disposed, or may be a controller of the inverter. When the controller is the controller of the inverter, the controller may be integrated into a cabinet of the inverter. In addition, each converter has a built-in control function, in other words, each converter may include a processor, and can adjust an input voltage and an output voltage of the converter. The controller may communicate with the converter in a wired manner or a wireless manner, for example, may communicate through power line communication, in other words, power system communication in which a transmission line is used as a transmission medium of a carrier signal. This is cost-effective, secure, and reliable. Embodiments of this application do not limit a manner of controllers and converters in communication. For example, the controller may communicate with each converter, or may communicate with one converter in each photovoltaic string, and then one converter in the photovoltaic string transfers an instruction of the controller to another converter in the same photovoltaic string.

The following describes in detail, with reference to accompanying drawings, a detailed process in which a photovoltaic system sets a voltage limiting value for a converter according to an embodiment of this application.

Figure 3:
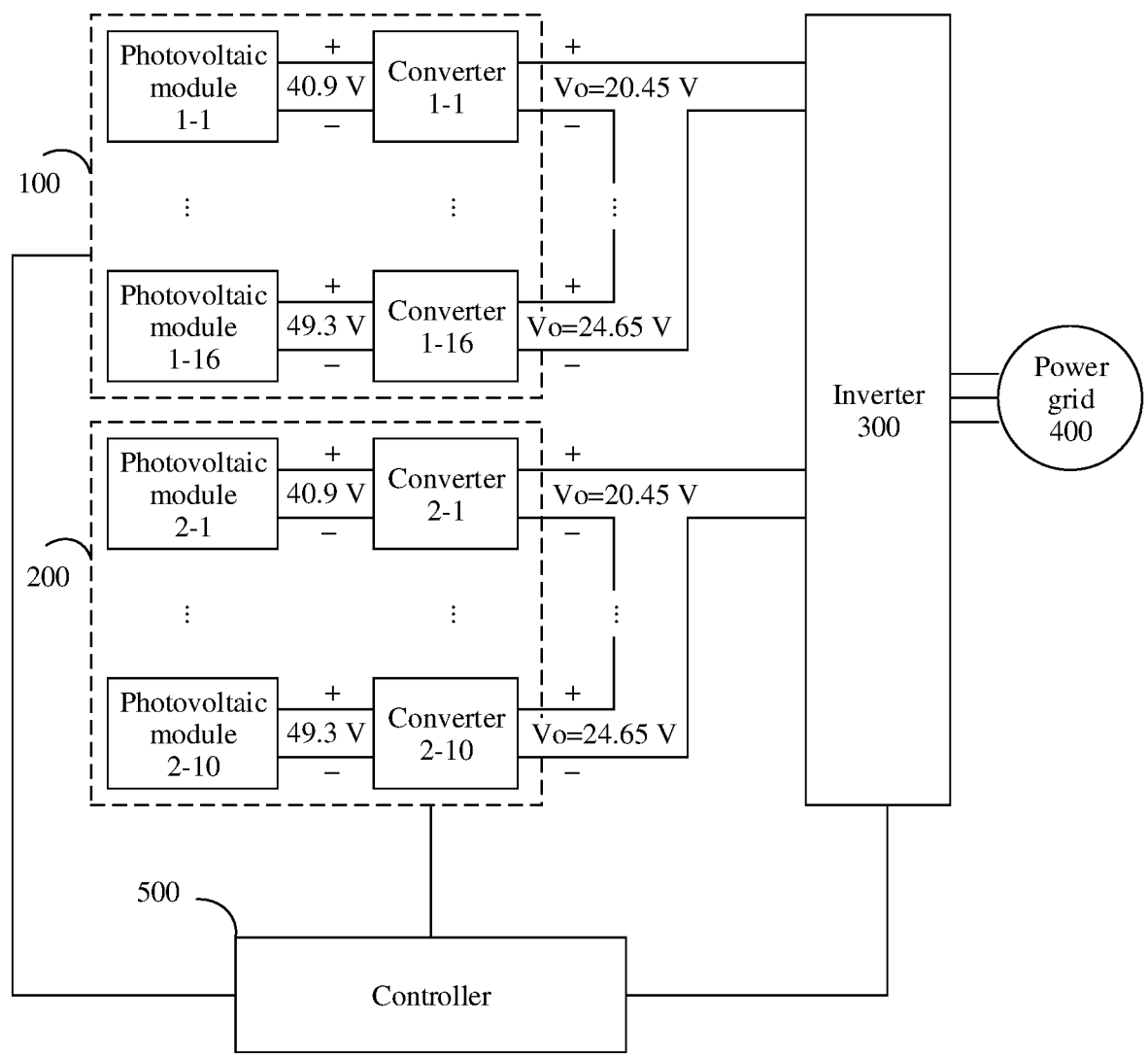
FIG. 3 is a schematic diagram of still another photovoltaic system according to an embodiment of this application.

FIG. 3 is a schematic diagram of still another photovoltaic system according to an embodiment of this application.

Each photovoltaic string includes at least two converters. In this embodiment of this application, an example in which a first photovoltaic string 100 includes 16 photovoltaic modules and corresponds to 16 converters is used, and a second photovoltaic string 200 includes 10 photovoltaic modules and corresponds to 10 converters is used. It is clear that, a quantity of photovoltaic modules included in the first photovoltaic string 100 and a quantity of photovoltaic modules included in the second photovoltaic string 200 are different. The technical solution provided in this embodiment may also be applicable to a case in which quantities of photovoltaic modules in the two photovoltaic strings are the same.

As shown in FIG. 3, in the first photovoltaic string 100, an input terminal of a converter 1-1 is connected to a photovoltaic module 1-1, and an input terminal of a converter 1-16 is connected to a photovoltaic module 1-16. In the second photovoltaic string 200, an input terminal of a converter 2-1 is connected to a photovoltaic module 2-1, and an input terminal of a converter 2-10 is connected to a photovoltaic module 2-10.

The following separately describes parameters of photovoltaic modules in the first photovoltaic string and parameters of photovoltaic modules in the second photovoltaic string.

Each of photovoltaic modules 1-1 to 1-8 in the first photovoltaic string and photovoltaic modules 2-1 to 2-5 in the second photovoltaic string consists of 60 battery units connected in series. Parameters under standard test conditions (STC, Standard Test Conditions) are as follows: Maximum power Pmpp=320 W, maximum power point voltage Vmpp=33.9 V, maximum power point current Impp=9.43 A, open circuit voltage Voc=40.9 V, and short-circuit current Isc=10.02 A.

Each of photovoltaic modules 1-9 to 1-16 in the first photovoltaic string and photovoltaic modules 2-6 to 2-10 in the second photovoltaic string consists of 72 battery units connected in series. Parameters under STC are as follows: Pmpp=400 W, Vmpp=40.6 V, Impp=9.86 A, Voc=49.3 V, and Isc=10.47 A.

It can be learned from the foregoing parameters that the first photovoltaic string includes at least a first group of photovoltaic modules (the photovoltaic modules 1-1 to 1-8) and a second group of photovoltaic modules (the photovoltaic modules 1-9 to 1-16). The parameters of the first group of photovoltaic modules are different from the parameters of the second group of photovoltaic modules.

The second photovoltaic string includes at least a third group of photovoltaic modules (the photovoltaic modules 2-1 to 2-5) and a fourth group of photovoltaic modules (the photovoltaic modules 2-6 to 2-10). The parameters of the third group of photovoltaic modules are different from the parameters of the fourth group of photovoltaic modules.

In this embodiment, to simplify analysis, it is assumed that the system has been split into photovoltaic strings. In other words, an inverter may perform processing on a per-photovoltaic string basis, and conversion efficiency of a converter is 100%. The parameters of the first group of photovoltaic modules are the same as the parameters of the third group of photovoltaic modules, and the parameters of the second group of photovoltaic modules are the same as the parameters of the fourth group of photovoltaic modules. It should be understood that the parameters of the first group of photovoltaic modules may alternatively be different from the parameters of the third group of photovoltaic modules. Similarly, the parameters of the second group of photovoltaic modules may also be different from the parameters of the fourth group of photovoltaic modules.

A controller is specifically configured to set a voltage limiting value based on a preset voltage and a sum of open circuit voltages of each photovoltaic string. The preset voltage is less than a maximum allowable input voltage of the inverter. For example, if the maximum allowable input voltage of the inverter is 600 V, the preset voltage may be a value less than but very close to 600 V. A larger value of the preset voltage indicates higher conversion efficiency of a converter.

Further, the controller may obtain a limiting proportion of each photovoltaic string by using a ratio of the preset voltage to the sum of open circuit voltages of each photovoltaic string. At least one converter in each photovoltaic string uses a product of an input voltage of the converter and the limiting proportion as the voltage limiting value. An input voltage of each converter can be obtained, and is a voltage of a photovoltaic module connected to an input of the converter. Input voltages of converters vary with different parameters of the converters. Even if limiting proportions of the converters are the same, voltage limiting values corresponding to the converters are different. It should be understood that, in this embodiment of this application, the controller may obtain a voltage limiting value of each converter and send the voltage limiting value of the converter to the converter. However, when there are a large quantity of converters, the number of tasks (task volume) handled by the controller is excessively large. This affects working efficiency of the controller. The controller may directly send a limiting proportion to a converter, and the converter obtains a voltage limiting value based on the received limiting proportion. Different photovoltaic strings may correspond to different limiting proportions, because the sum of open circuit voltages of each photovoltaic string is different, and a limiting proportion is proportional to a preset voltage, and is inversely proportional to the sum of open circuit voltages of a photovoltaic string. This is expressed by using a formula as follows:

Limiting proportion=Preset voltage/Sum of open circuit voltages of a photovoltaic string.

For both the photovoltaic strings, the preset voltage is the same, and a difference lies only in the sum of open circuit voltages.

For example, the maximum allowable input voltage of the inverter is 600 V, and the preset voltage set by the controller may be 500 V. It should be understood that the preset voltage may alternatively be another value less than 600 V. In this embodiment of this application, 500 V is merely used as an example for description.

The following describes two manners of obtaining a sum of open circuit voltages of a photovoltaic string.

Manner 1:

The controller obtains a sum of open circuit voltages of each photovoltaic string based on a voltage ratio of a plurality of photovoltaic strings and an output voltage of each photovoltaic string.

Manner 2:

The controller obtains a sum of open circuit voltages of each photovoltaic string based on an open circuit voltage reported by a converter in the photovoltaic string.

A specific manner of obtaining a sum of open circuit voltages of a photovoltaic string by a controller is not specifically limited in this embodiment of this application, and another manner other than the foregoing two manners may be used.

The following specifically describes the manner 1 of obtaining a sum of open circuit voltages of a photovoltaic string.

The controller may send a voltage ratio K1=0.5 to the first photovoltaic string and the second photovoltaic string in a multicast manner, to control output voltages of converters in the first photovoltaic string and the second photovoltaic string.

The controller sends the voltage ratio to the first photovoltaic string and the second photovoltaic string in the multicast manner. The inverter directly sends the voltage ratio to the converters in the photovoltaic strings in a multicast manner without obtaining a quantity of converters in each photovoltaic string in advance. This manner of delivering a control instruction is simple and fast.

It should be understood that a value of K1 should be less than 1, and a principle of setting K1 is to ensure that overvoltage of an input voltage of the inverter does not occur, to be specific, to ensure that the input voltage of the inverter is less than 600 V, and that the input voltage of the inverter is as high as possible to improve precision of calculating a sum of open circuit voltages of a photovoltaic string. For example, K1 may be 0.5, 0.6, 0.4, 0.3, or the like, and a person skilled in the art can select the value based on an actual requirement. K1 of different photovoltaic strings may be the same or different. In this embodiment, an example in which K1 of the first photovoltaic string and K1 of the second photovoltaic string are the same is used for description.

For example, after receiving K1, the converter in the first photovoltaic string 100 controls an output voltage to be equal to an input voltage*K1.

As shown in FIG. 3, output voltages of the converters 1-1 to 1-8 in the first photovoltaic string 100 are 40.9 V*0.5=20.45 V.

Output voltages of the converters 1-9 to 1-16 in the first photovoltaic string 200 are 49.3 V*0.5=24.65 V.

A sum of output voltages of the first photovoltaic string is 20.45 V*8+24.65 V*8=360.8 V.

It should be noted that the foregoing only describes the output voltages of the converters by using a calculation process. Because the voltage ratio sent by the controller is 0.5, each converter controls the output voltage of the converter based on the voltage ratio of 0.5. However, a sum of open circuit voltages of the photovoltaic string finally obtained by the controller is not what is obtained through the foregoing calculation of the converters, but the input voltage of the inverter collected by the controller. The converters corresponding to the photovoltaic strings are connected in series to form a converter string. The converter string is connected to the input terminal of the inverter, and the input voltage of the inverter is an output voltage of the converter string.

In this case, the system is in an initial state, and the inverter is not connected to the grid for power generation. Therefore, an output power of the photovoltaic module is approximately 0 W, and an output voltage of the photovoltaic module is approximately the open circuit voltage.

The open circuit voltage of the photovoltaic module varies with factors such as ambient temperature, irradiation, and the like. In this embodiment, only an open circuit voltage under STC is used for description.

Based on a voltage of 360.8 V of the sampled converters 1 to 16 connected in series, the controller may calculate the sum of open circuit voltages of the first photovoltaic string to be the collected input voltage/K1=360.8 V/K1=721.6 V.

It is clear that, the sum of open circuit voltages of the first photovoltaic string is 721.6 V, and exceeds the maximum allowable input voltage of the inverter, namely, 600 V. Therefore, the converter of the first photovoltaic string needs to limit the output voltage.

Similarly, each converter in the second photovoltaic string controls an output voltage based on the received voltage ratio K1=0.5. The following describes an output voltage of each converter in the second photovoltaic string.

As shown in FIG. 3, output voltages of the converters 2-1 to 2-5 in the second photovoltaic string 200 are 40.9 V*0.5=20.45 V.

Output voltages of the converters 2-6 to 2-10 in the second photovoltaic string 200 are 49.3 V*0.5=24.65 V.

A sum of output voltages of the second photovoltaic string is 20.45 V*5+24.65 V*5=225.5 V.

The foregoing merely describes, through calculation, that each converter outputs a voltage based on the ratio of K1=0.5. However, similar to the first photovoltaic string, a sum of open circuit voltages of the second photovoltaic string that the controller obtains is obtained by sampling a voltage after the converters of the second photovoltaic string are connected in series, and an obtained sampled voltage is 225.5 V.

Based on the sampled input voltage of 225.5 V, the inverter obtains the sum of open circuit voltages of the second photovoltaic string=225.5 V/K1=451 V.

The foregoing controller obtains the sum of open circuit voltages of the first photovoltaic string and the sum of open circuit voltages of the second photovoltaic string. The following describes a process in which the inverter obtains a limiting proportion based on the preset voltage and the sum of open circuit voltages of each photovoltaic string. It should be understood that preset voltages corresponding to the first photovoltaic string and the second photovoltaic string are the same, but the sum of open circuit voltages corresponding to the first photovoltaic string and the sum of open circuit voltages corresponding to the second photovoltaic string are different. Therefore, a limiting proportion corresponding to the first photovoltaic string and a limiting proportion corresponding to the second photovoltaic string are different. The converter in each photovoltaic string limits the output voltage based on a limiting proportion corresponding to the converter.

The following uses an example in which the preset voltage set by the controller is 500 V for description.

The limiting proportion K21 of the first photovoltaic string equals the preset voltage/the sum of open circuit voltages of the first photovoltaic string=500 V/721.6 V=0.6929.

The limiting proportion K22 of the second photovoltaic string equals the preset voltage/the sum of open circuit voltages of the second photovoltaic string=500 V/451 V=1.1086.

The controller may deliver the limiting proportion corresponding to each photovoltaic string to each converter in a multicast manner. The controller is specifically configured to send the limiting proportion of the first photovoltaic string to at least one converter in the first photovoltaic string through power line communication, and send the limiting proportion of the second photovoltaic string to at least one converter in the second photovoltaic string, so that the at least one converter in the first photovoltaic string sets a corresponding voltage limiting value based on the limiting proportion of the first photovoltaic string, and the at least one converter in the second photovoltaic string sets a corresponding voltage limiting value based on the limiting proportion of the second photovoltaic string.

A parameter delivered by the controller to each converter is a limiting proportion, and a voltage limiting value of each converter is obtained based on the limiting proportion and an open circuit voltage of a photovoltaic module connected to the converter.

First, the voltage limiting value of each converter in the first photovoltaic string is described.

Each converter in the first photovoltaic string receives the limiting proportion K21, and sets an output voltage limiting value to an input voltage*K21.

Figure 4:
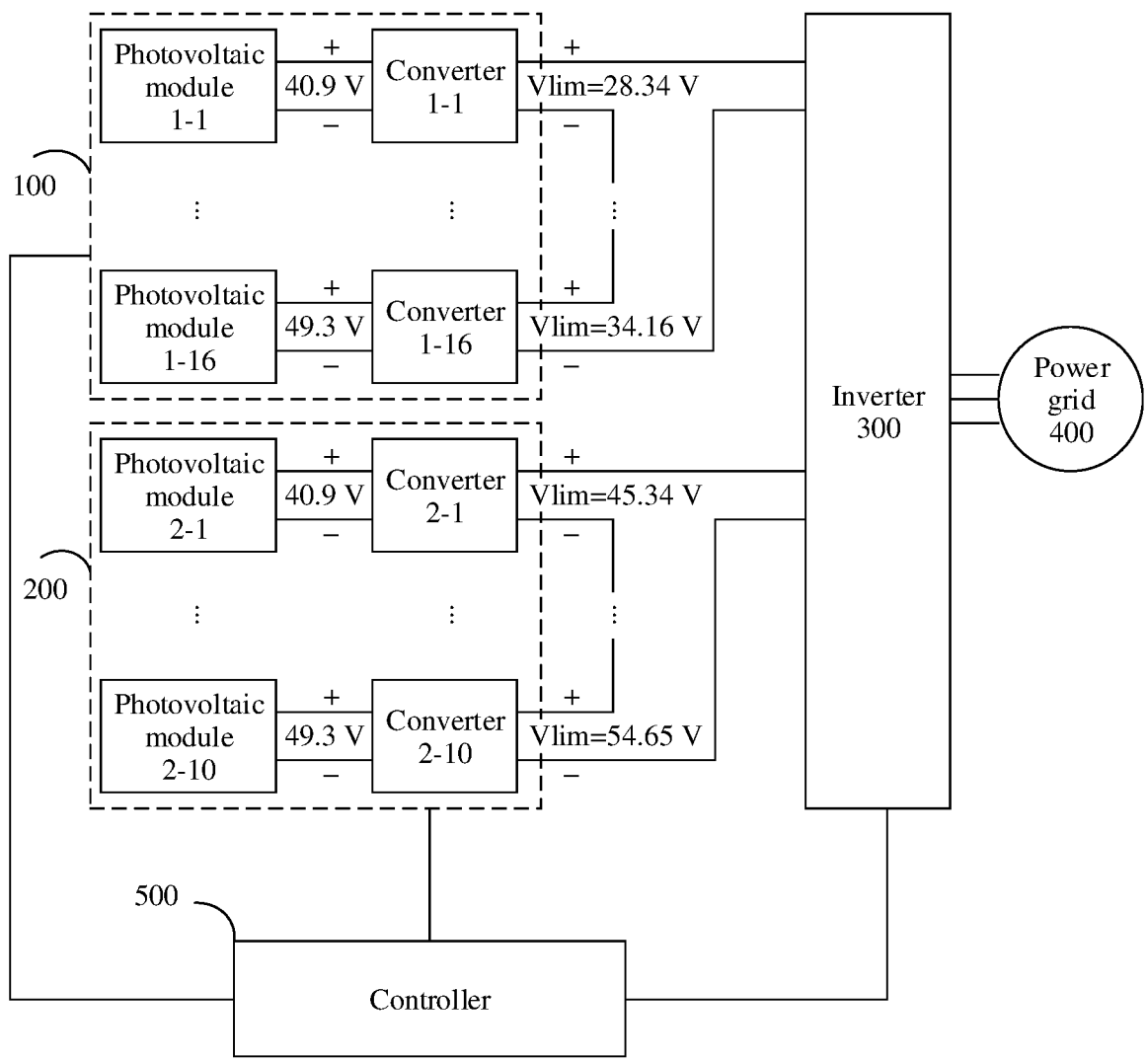
FIG. 4 is a schematic diagram of a voltage limiting value of each converter according to an embodiment of this application.

As shown in FIG. 4, voltage limiting values of converters 1-1 to 1-8 in the first photovoltaic string 100 are 40.9 V*0.6929=28.34 V.

Voltage limiting values of converters 1-9 to 1-16 in the first photovoltaic string 100 are 49.3 V*0.6929=34.16 V.

A limiting voltage of the first photovoltaic string is 28.34 V*8+34.16 V*8=500 V.

Second, the voltage limiting value of each converter in the second photovoltaic string is described.

Each converter in the second photovoltaic string receives the limiting proportion K22, and sets an output voltage limiting value to an input voltage*K22.

As shown in FIG. 4, voltage limiting values of converters 2-1 to 2-5 in the second photovoltaic string 200 are 40.9 V*1.1086=45.34 V.

Voltage limiting values of converters 2-6 to 2-10 in the second photovoltaic string 200 are 49.3 V*1.1086=54.65 V.

A limiting voltage of the second photovoltaic string is 45.34 V*5+54.65 V*5=500 V.

It can be learned from the foregoing analysis that the limiting proportion is proportional to the preset voltage and inversely proportional to the sum of open circuit voltages of the photovoltaic string. To increase the limiting proportion, the preset voltage may be increased, so that the limiting proportion is increased. In this way, the converter can work at a high step-down ratio. This helps improve conversion efficiency of the converter. In addition, if the voltage limiting value is higher than the input voltage of the converter, it indicates that the voltage limiting value does not work, and the converter works in a direct-through mode. This helps improve conversion efficiency of the converter, and helps improve electric energy conversion efficiency of the photovoltaic system. If the limiting proportion needs to be increased, the preset voltage needs be set as high as possible, and the preset voltage can be very close to the maximum allowable input voltage of the inverter, provided that overvoltage of the input terminal of the inverter does not occur.

In the photovoltaic system provided in this embodiment of this application, not only an open circuit voltage of a corresponding photovoltaic module, but also a sum of open circuit voltages of a photovoltaic string in which the converter is located are considered for a voltage limiting value of each converter. Therefore, the voltage limiting value is proportional to the open circuit voltage of the photovoltaic module so that the converter can maximize conversion efficiency, and the voltage limiting value is set to be as large as possible. In addition, the voltage limiting value is inversely proportional to the sum of open circuit voltages of the photovoltaic string, so that the voltage obtained by connecting the converters in series does not exceed the maximum allowable voltage value of the inverter.

The photovoltaic system provided in this embodiment of this application may further adjust the voltage limiting value based on a working status of the inverter, specifically, reduce the voltage limiting value. For example, in a possible implementation, the controller sends a modification coefficient to a converter in each photovoltaic string in a multicast manner, and the converter corrects the voltage limiting value based on the modification coefficient, where the modification coefficient is less than 1. In another case, the controller directly corrects the limiting proportion corresponding to each photovoltaic string based on the modification coefficient, sends the corrected limiting proportion to each photovoltaic string in a multicast manner, and after receiving the corrected limiting proportion, the converter in each photovoltaic string recalculates the voltage limiting value. The control output voltage is obtained based on a recalculated voltage limiting value.

The foregoing working status of the inverter may be that the inverter works abnormally. For example, a working abnormality is that a temperature of the inverter exceeds a preset threshold. Specifically, a temperature sensor may be disposed inside a cabinet of the inverter. When the temperature measured by the temperature sensor exceeds the preset threshold, the controller may send a modification coefficient to at least one converter in each photovoltaic string in a multicast manner, where the modification coefficient is used for reducing the voltage limiting value. When the inverter is connected to the grid for power generation, and the inverter is derated due to overtemperature because of some reason(s), for example, because an input voltage of the inverter is high, the input voltage of the inverter needs to be reduced so that the inverter is not derated due to overtemperature.

An example in which the modification coefficient K3 sent by the controller in the multicast manner is 0.8 is used for description in the following descriptions. The modification coefficient is less than 1, to reduce the voltage limiting value. A smaller modification coefficient indicates a larger decrease in the voltage limiting value. For example, when the temperature of the inverter greatly exceeds the preset threshold, it indicates that the temperature of the inverter is excessively high, and the voltage limiting value needs to be greatly reduced. In this case, a smaller modification coefficient may be set.

Figure 5:
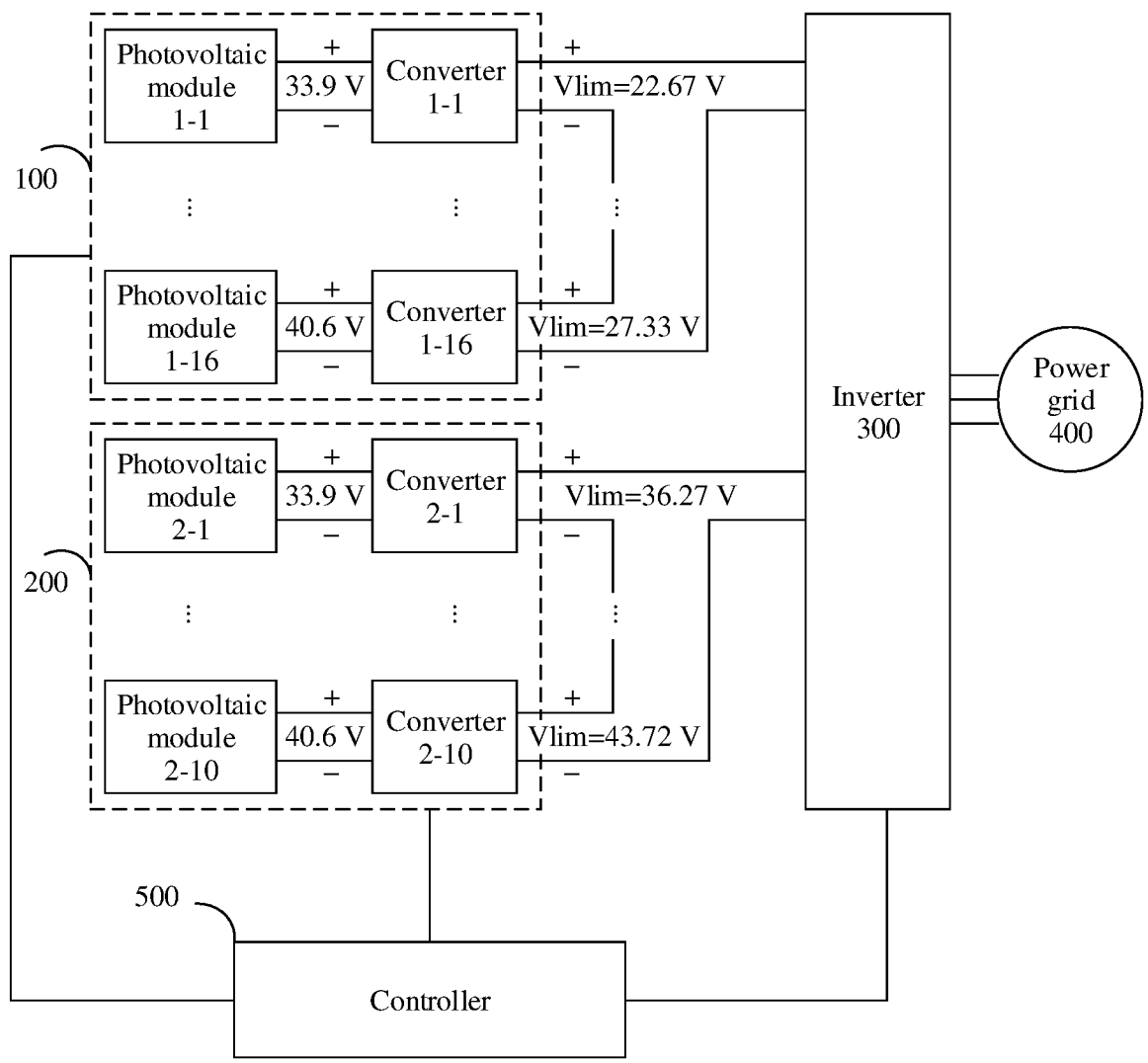
FIG. 5 is a schematic diagram of yet another photovoltaic system according to an embodiment of this application.

FIG. 5 is a schematic diagram of yet another photovoltaic system according to an embodiment of this application.

The inverter delivers a control instruction K3=0.8 to the first photovoltaic string in the multicast manner, to adjust the voltage limiting value of the converter in the first photovoltaic string.

After receiving K3, each converter in each photovoltaic string reduces the voltage limiting value to 80% of the original voltage limiting value.

Voltage limiting values of converters 1-1 to 1-8 in the first photovoltaic string 100 are 28.34 V*0.8=22.67 V.

Voltage limiting values of converters 1-9 to 1-16 in the first photovoltaic string 100 are 34.16 V*0.8=27.33 V.

After the converter in the first photovoltaic string 100 adjusts the voltage limiting value, the limiting voltage of the first photovoltaic string 100 is 22.67 V*8+27.33 V*8=400 V.

That the converter in the second photovoltaic string 200 updates the voltage limiting value is the same as the process of the first photovoltaic string 100, and is specifically as follows:

Voltage limiting values of converters 2-1 to 2-5 in the second photovoltaic string 200 are 45.34 V*0.8=36.27 V.

Voltage limiting values of converters 2-6 to 2-10 in the second photovoltaic string 200 are 54.65 V*0.8=43.72 V.

The limiting voltage of the second photovoltaic string 200 is 36.27 V*5+43.72 V*5=400 V.

The foregoing is merely an example in which the modification coefficient K3=0.8. During actual application, the limiting proportion K3 may be adjusted based on an actual step-down, and limiting proportions K3 of different photovoltaic strings may be the same or different. The foregoing descriptions are merely provided by using an example in which the modification coefficients of the photovoltaic strings are the same. It can be learned from the foregoing results that decrease in the voltage limiting value of the converter inevitably leads to decrease in the output voltage of the converter. Therefore, the input voltage of the inverter is decreased, and the inverter is not derated due to overtemperature.

The foregoing embodiments describe the manner of setting the voltage limiting value of the converter in the photovoltaic system. That the converter may have two working modes, namely, the voltage limiting mode and the MPPT mode is also described above. Generally, the converter works in the MPPT mode. The following describes how to obtain an output PV curve of the converter on the premise that overvoltage of the input voltage of the inverter does not occur.

When the converter includes a buck circuit, in other words, when the converter is a buck converter, the converter controls an output PV curve of the converter based on a PV curve of the connected photovoltaic module and a corresponding voltage limiting value. The following describes the output PV curve of the converter in detail with reference to the accompanying drawings.

A specific control policy of the converter is as follows: An output PV curve of the converter is partially similar to an output PV curve of the photovoltaic module, in other words, voltage limiting of the converter is implemented by simulating an output feature of the photovoltaic module, so that the converter can be equivalent to a photovoltaic module. In other words, from a perspective of the inverter, the photovoltaic module and the converter may be considered as a new photovoltaic module, so that an existing MPPT control policy of the inverter can be adapted when the output voltage of the converter is limited, and stability of the photovoltaic system can be ensured.

The following continues to use the example of two photovoltaic strings. First, the first photovoltaic string is described.

Figure 6:
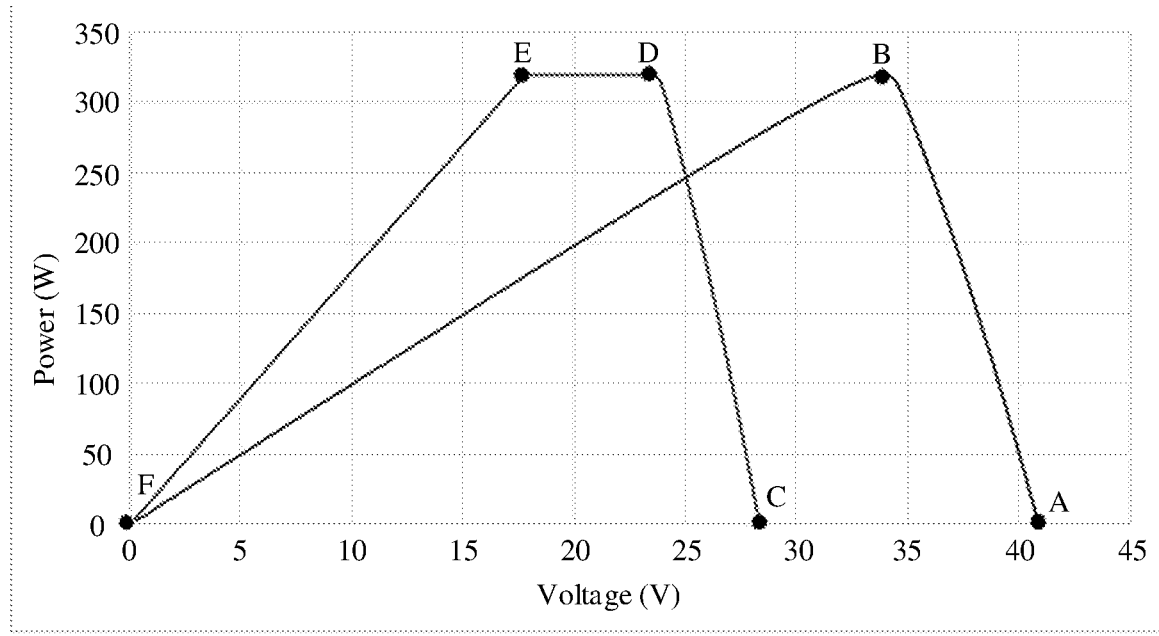
FIG. 6 is a diagram of an output PV curve of converters 1-1 to 1-8 in a first photovoltaic string and a PV curve of photovoltaic modules 1-1 to 1-8 according to an embodiment of this application.
Figure 7:
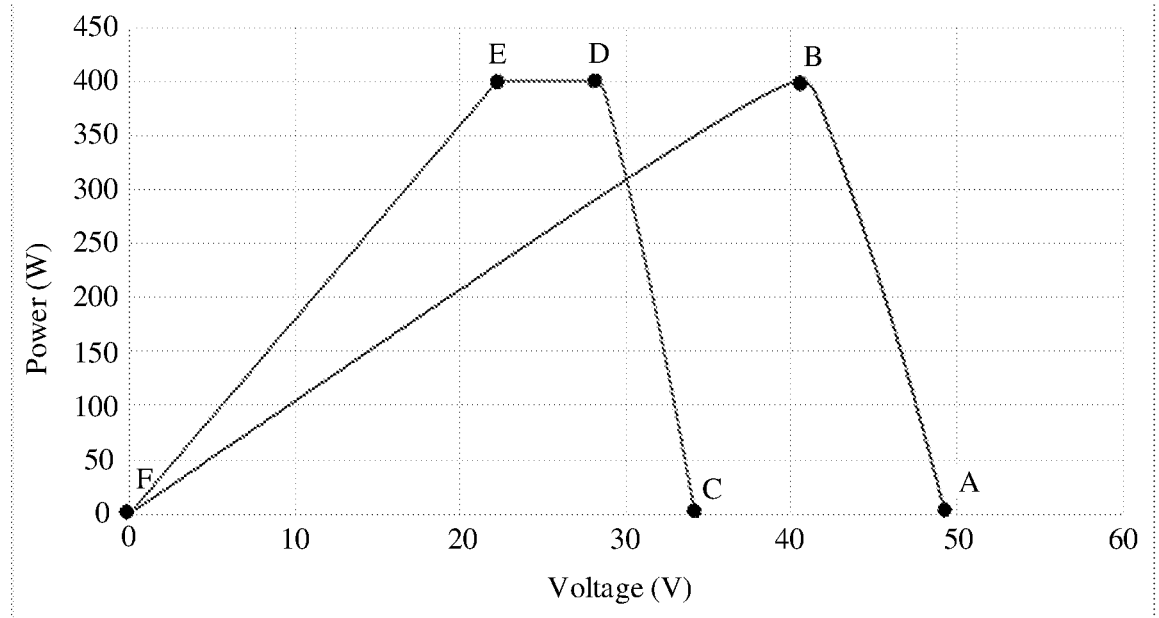
FIG. 7 is a diagram of an output PV curve of converters 1-9 to 1-16 in a first photovoltaic string and a PV curve of photovoltaic modules 1-9 to 1-16 according to an embodiment of this application.
Figure 8:
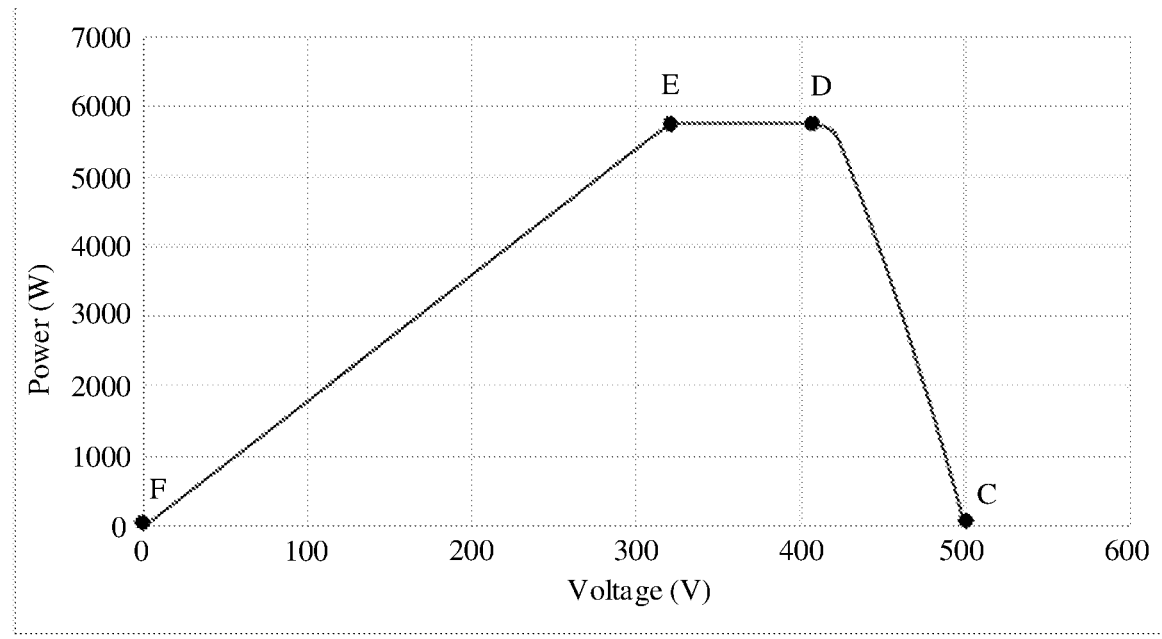
FIG. 8 is a diagram of an output PV curve of a first photovoltaic string according to an embodiment of this application.

Refer to FIG. 6 to FIG. 8. FIG. 6 is an output PV curve of the converters 1-1 to 1-8 in the first photovoltaic string and a PV curve of the photovoltaic modules 1-1 to 1-8 according to an embodiment of this application. FIG. 7 is a diagram of an output PV curve of the converters 1-9 to 1-16 in the first photovoltaic string and a PV curve of the photovoltaic modules 1-9 to 1-16 according to an embodiment of this application. FIG. 8 is a diagram of an output PV curve of the first photovoltaic string according to an embodiment of this application.

The curve ABF in FIG. 6 is the PV curve of the photovoltaic modules 1-1 to 1-8, and the curve CDEF in FIG. 6 is the output PV curve of the converters 1-1 to 1-8. The curve ABF in FIG. 7 is the PV curve of the photovoltaic modules 1-9 to 1-16, and the curve CDEF in FIG. 7 is the output PV curve of the converters 1-9 to 1-16. The curve CDEF in FIG. 8 may be obtained as the PV curve of the first photovoltaic string by integrating FIG. 6 and FIG. 7.

In FIG. 6, because the curve ABF is the PV curve of the photovoltaic modules 1-1 to 1-8, the curve is known. The point C is the voltage limiting value of the converters 1-1 to 1-8, and is also known. In this way, the curve CD can be obtained based on the curve AB and the point C: a ratio of a voltage corresponding to the CD curve to a voltage corresponding to the AB curve is the same. FIG. 7 is similar. Therefore, the output PV curve of the converter is obtained by using the PV curve of the photovoltaic string and the voltage limiting value of the converter, and the PV curve of the entire photovoltaic string can be obtained by superposing output PV curves of all the converters in the photovoltaic string, in other words, the PV curve of the first photovoltaic string shown in FIG. 8 can be obtained based on FIG. 6 and FIG. 7. The following calculation is continued by using the data provided in the foregoing embodiment.

An existing MPPT control policy of the inverter can ensure that the output voltage of the first photovoltaic string is stable at the point D, and the output voltage of the first photovoltaic string is 22.47 V*8+28.13 V*8=404.8 V, and an output current is 14.23 A.

A point for stable working of the converters 1-1 to 1-8 is as follows: an input voltage/input current is 33.9 V/9.43 A, an output voltage/output current is 22.47 V/14.23 A, the converter works in the buck mode, and a step-down ratio is 0.6628.

A point for stable working of the converters 1-9 to 1-16 is as follows: an input voltage/input current is 40.6 V/9.86 A, an output voltage/output current is 28.13 V/14.23 A, the converter works in the buck mode, and a step-down ratio is 0.6929.

The following describes the PV curve of the second photovoltaic string.

Figure 9:
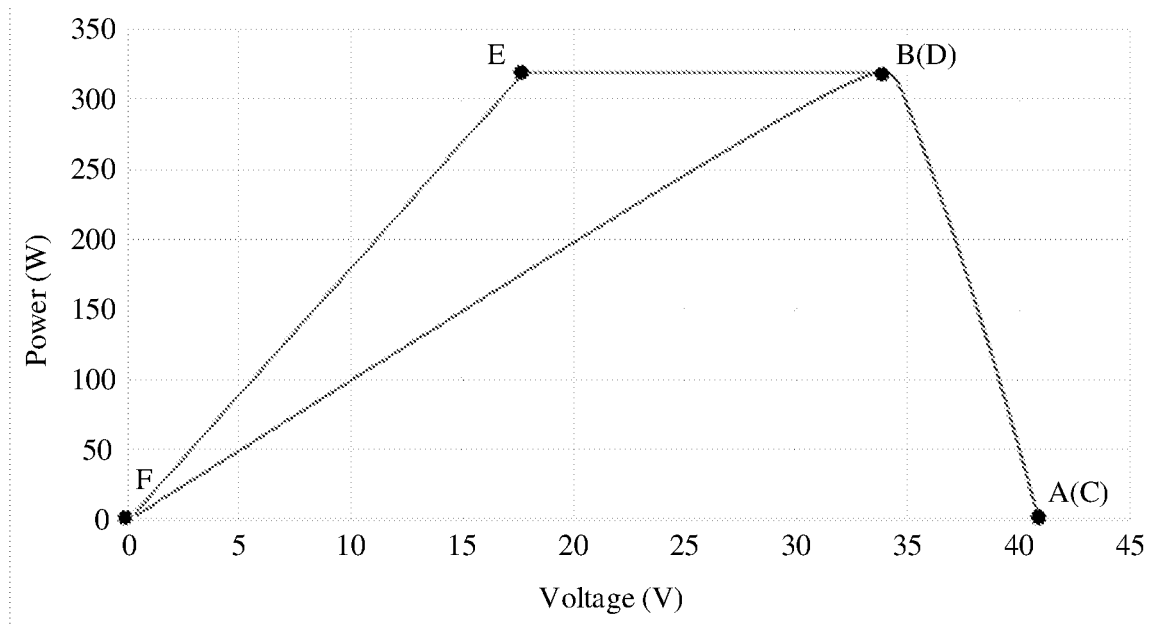
FIG. 9 is a diagram of an output PV curve of converters 2-1 to 2-5 in a first photovoltaic string and a PV curve of photovoltaic modules 2-1 to 2-5 according to an embodiment of this application.
Figure 10:
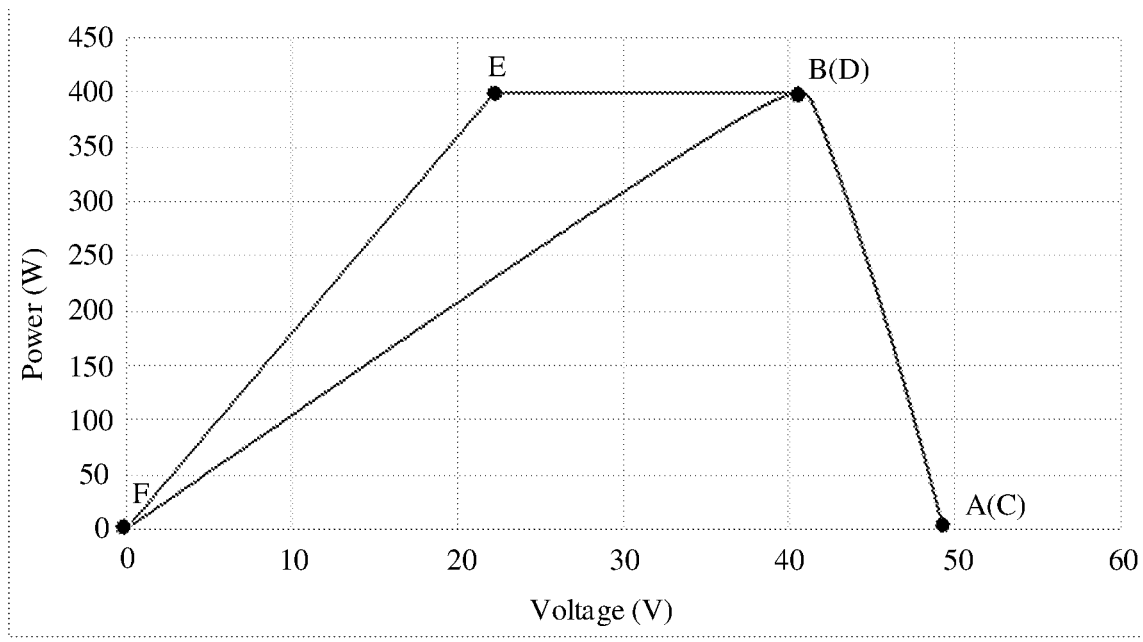
FIG. 10 is a diagram of an output PV curve of converters 2-6 to 2-10 in a first photovoltaic string and a PV curve of photovoltaic modules 2-6 to 2-10 according to an embodiment of this application.
Figure 11:
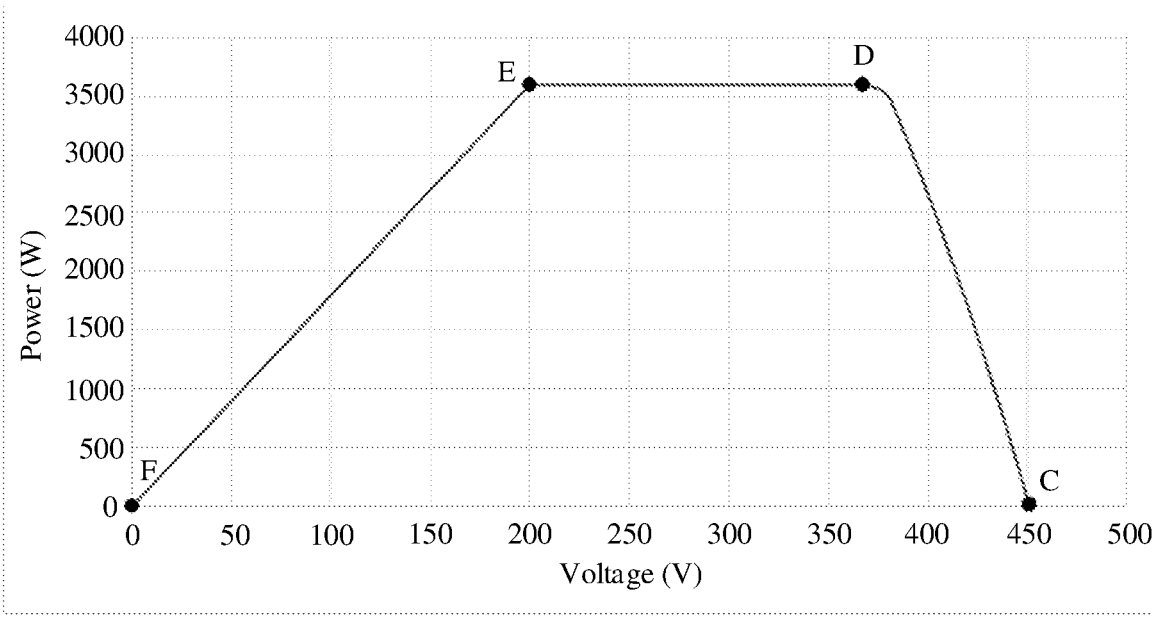
FIG. 11 is a diagram of an output PV curve of a first photovoltaic string according to an embodiment of this application.

Refer to FIG. 9 to FIG. 11. FIG. 9 is an output PV curve of the converters 2-1 to 2-5 in the second photovoltaic string and a PV curve of the photovoltaic modules 2-1 to 2-5 according to an embodiment of this application. FIG. 10 is a diagram of an output PV curve of the converters 2-6 to 2-10 in the second photovoltaic string and a PV curve of the photovoltaic modules 2-6 to 2-10 according to an embodiment of this application. FIG. 11 is a diagram of an output PV curve of the second photovoltaic string according to an embodiment of this application.

The following calculation is continued by using the data provided in the foregoing embodiment.

An existing MPPT control policy of the inverter can ensure that the output voltage of the second photovoltaic string is stable at the point D, and the output voltage of the second photovoltaic string is 32.42 V*5+40.6 V*5=365.1 V, and an output current is 9.86 A.

A point for stable working of the converters 2-1 to 2-5 is as follows: an input voltage/input current is 33.9 V/9.43 A, an output voltage/output current is 32.42 V/9.86 A, the converter works in the buck mode, and a step-down ratio is 0.9563.

A point for stable working of the converters 2-6 to 2-10 is as follows: an input voltage/input current is 40.6 V/9.86 A, an output voltage/output current is 40.6 V/9.86 A, the converter works in the direct-through mode, and a step-down ratio is 1.0.

In the photovoltaic system provided in this embodiment of this application, the voltage limiting values of the converters may be set differently based on a difference in configurations of photovoltaic modules. This improves conversion efficiency of the converters. Further, the photovoltaic string can be better controlled by using a PV curve obtained based on a differentiated voltage limiting value, to perform maximum power tracking. This can further improve conversion efficiency of the entire photovoltaic string and improve energy conversion efficiency of the photovoltaic system.

Method Embodiment

According to the photovoltaic system provided in the foregoing embodiments, an embodiment of this application further provides a photovoltaic system control method. The following describes in detail with reference to accompanying drawings. It should be understood that the control method provided in embodiments of this application is applicable to the photovoltaic system provided in the foregoing embodiments, and the photovoltaic system includes an inverter, a controller, and at least two converters. Output terminals of the at least two converters are connected in series and connected to an input terminal of the inverter. Each photovoltaic string corresponds to at least two converters. An input terminal of each of the at least two converters is connected to a corresponding photovoltaic module. Each photovoltaic string corresponds to at least two converters. For example, an example in which there are two photovoltaic strings is used. Refer to FIG. 2. Details are not described herein again.

The photovoltaic system control method provided in this embodiment includes:

setting a voltage limiting value of at least one corresponding converter of the at least two converters, so that the at least one converter works based on the voltage limiting value when working in a voltage limiting mode, where the voltage limiting value of the at least one converter is proportional to an open circuit voltage of a photovoltaic module connected to an input terminal of the converter, and is inversely proportional to a sum of open circuit voltages of a photovoltaic string in which the converter is located.

The foregoing control method may be performed by a controller, where the controller may be independently disposed, or may be a controller of the inverter. When the controller is the controller of the inverter, the controller may be disposed inside a cabinet of the inverter. The controller sets the voltage limiting value of the at least one converter of the at least two converters, so that the at least one converter works based on the voltage limiting value when working in the voltage limiting mode. The voltage limiting value of the at least one converter is proportional to the open circuit voltage of the photovoltaic module connected to the input terminal of the at least one converter, and is inversely proportional to the sum of open circuit voltages of the photovoltaic string in which the converter is located.

For example, as shown in FIG. 2, the voltage limiting value of the converter 1-1 is proportional to the open circuit voltage of the photovoltaic module 1-1 connected to the input terminal of the converter 1-1 and is inversely proportional to the sum of open circuit voltages of the first photovoltaic string 100 in which the converter 1-1 is located. For the converter 2-1, the voltage limiting value of the converter 2-1 is proportional to the open circuit voltage of the photovoltaic module 2-1 connected to the input terminal of the converter 2-1, and is inversely proportional to the sum of open circuit voltages of the second photovoltaic string 200 in which the converter 2-1 is located.

It is clear that, according to the photovoltaic system control method provided in this embodiment of this application, a voltage limiting value of each converter is no longer restricted to being set to a fixed value. The voltage limiting value of each converter depends on an open circuit voltage of a photovoltaic module connected to the converter, and also depends on a sum of open circuit voltages of a photovoltaic string in which the converter is located. In this way, for the voltage limiting value configured for each converter, the open circuit voltage of the photovoltaic module connected to the converter is fully considered, so that the converter works at high conversion efficiency. For example, for a same photovoltaic string, a photovoltaic module with a high open circuit voltage corresponds to a high voltage limiting value of a converter, and a photovoltaic module with a low open circuit voltage corresponds to a low voltage limiting value of a converter. Voltage limiting values of converters in a same photovoltaic string vary with different parameters of photovoltaic modules. This helps improve conversion efficiency of the converters.

The following describes in detail, with reference to accompanying drawings, a process of setting a voltage limiting value by using a control method according to an embodiment of this application.

Figure 12:
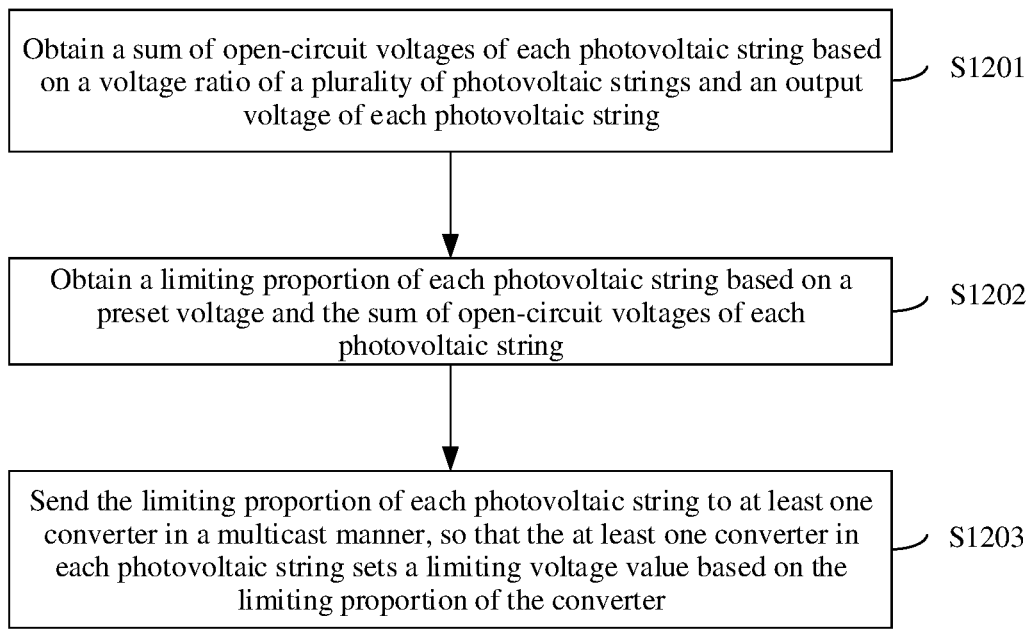
FIG. 12 is a flowchart of a control method according to an embodiment of this application.

FIG. 12 is a flowchart of a control method according to an embodiment of this application.

S1201: Obtain a sum of open circuit voltages of each photovoltaic string based on a voltage ratio of a plurality of photovoltaic strings and an output voltage of each photovoltaic string.

The voltage ratio is K1 described in the foregoing photovoltaic system embodiments. Details are not described herein again. An output voltage of each photovoltaic string may be obtained through collection. For example, an inverter collects an output voltage of a photovoltaic string connected to the inverter.

Divide the output voltage of each photovoltaic string by the voltage ratio to obtain the sum of open circuit voltages of the photovoltaic string.

In addition, in this embodiment of this application, the sum of open circuit voltages of each photovoltaic string may be alternatively obtained based on an open circuit voltage reported by a converter in the photovoltaic string.

S1202: Obtain a limiting proportion of each photovoltaic string based on a preset voltage and the sum of open circuit voltages of the photovoltaic string.

In one embodiment, the preset voltage needs to be less than a maximum input voltage of the inverter to ensure that overvoltage of an input voltage of the inverter does not occur.

A ratio of the preset voltage to the sum of open circuit voltages of the photovoltaic string is the limiting proportion corresponding to the photovoltaic string. It can be learned that the limiting proportion of each photovoltaic string is inversely proportional to the sum of open circuit voltages of the photovoltaic string.

S1203: Send the limiting proportion of each photovoltaic string to at least one converter in the photovoltaic string in a multicast manner, so that the at least one converter in each photovoltaic string sets a voltage limiting value based on the limiting proportion of the converter.

The voltage limiting value of each converter is obtained by multiplying the limiting proportion of each converter and an open circuit voltage of the photovoltaic string connected to the converter. It should be understood that limiting proportions of different photovoltaic strings may be different, and open circuit voltages corresponding to different converters may be different.

That the controller sends the limiting proportion of each photovoltaic string to the photovoltaic string in a multicast manner has an advantage that a quantity of converters in each photovoltaic string does not need to be known in advance.

In a specific implementation, each photovoltaic string corresponds to at least two converters. The setting a voltage limiting value of at least one corresponding converter of the at least two converters specifically includes:

setting the voltage limiting value based on the preset voltage and the sum of open circuit voltages of each photovoltaic string.

In a possible implementation, the limiting proportion of each photovoltaic string may be obtained by using a ratio of the preset voltage to the sum of open circuit voltages of the photovoltaic string. In this way, the limiting proportion of each photovoltaic string can be obtained. The limiting proportion of each photovoltaic string is sent to at least one converter in each photovoltaic string, where the at least one converter in each photovoltaic string uses a product of an input voltage of the converter and the limiting proportion as the voltage limiting value. An input voltage of each converter can be obtained, and is a voltage of a photovoltaic module connected to an input of the converter. Input voltages of converters vary with different parameters of the converters. Even if limiting proportions of the converters are the same, voltage limiting values corresponding to the converters are different.

The preset voltage is less than a maximum allowable input voltage of the inverter.

In a specific implementation, obtaining a limiting proportion of each photovoltaic string based on a preset voltage and the sum of open circuit voltages of the photovoltaic string, so that at least one converter in each photovoltaic string sets a voltage limiting value based on the limiting proportion of the at least one converter in each photovoltaic string specifically includes:

sending the limiting proportion of the first photovoltaic string to at least one converter in the first photovoltaic string through power line communication, and sending the limiting proportion of the second photovoltaic string to at least one converter in the second photovoltaic string, so that the at least one converter in the first photovoltaic string sets a corresponding voltage limiting value based on the limiting proportion of the first photovoltaic string, and the at least one converter in the second photovoltaic string sets a corresponding voltage limiting value based on the limiting proportion of the second photovoltaic string.

The photovoltaic system control method provided in this embodiment of this application further includes: when the inverter works abnormally, sending a modification coefficient to at least one converter in each photovoltaic string in a multicast manner, where the modification coefficient is used for reducing the voltage limiting value, and the modification coefficient is less than 1.

The foregoing working status of the inverter may be that the inverter works abnormally. For example, a working abnormality is that a temperature of the inverter exceeds a preset threshold. Specifically, a temperature sensor may be disposed inside a cabinet of the inverter. When the temperature measured by the temperature sensor exceeds the preset threshold, the controller may send a modification coefficient to at least one converter in each photovoltaic string in a multicast manner, where the modification coefficient is used for reducing the voltage limiting value. When the inverter is connected to the grid for power generation, and the inverter is derated due to overtemperature because of some reasons, for example, because an input voltage of the inverter is high, the input voltage of the inverter needs to be reduced so that the inverter is not derated due to overtemperature.

When the converter includes a buck circuit, in other words, when the converter is a buck converter, the converter controls an output PV curve of the converter based on a PV curve of the connected photovoltaic module and a corresponding voltage limiting value. For details, refer to descriptions in FIG. 6 to FIG. 11.

According to the control method provided in this embodiment of this application, the voltage limiting values of the converters may be set differently based on a difference in configurations of photovoltaic modules. This improves conversion efficiency of the converters. Further, the photovoltaic string can be better controlled by using a PV curve obtained based on a differentiated voltage limiting value, to perform maximum power tracking. This can further improve conversion efficiency of the entire photovoltaic string and improve energy conversion efficiency of the photovoltaic system.

It should be understood that in this application, "at least one (item)" refers to one or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" generally represents an "or" relationship between the associated objects. "At least one of the following items (pieces)" or a similar expression thereof indicates any combination of these items, including a single item (piece) or any combination of a plurality of items (pieces). For example, at least one of a, b, and c may indicate a, b, c, "a and b", "a and c", "b and c", or "a, b, and c", where a, b, and c may be singular or plural.

The foregoing descriptions are merely example embodiments of this application, and are not intended to limit this application in any form. Although the example embodiments of this application are disclosed above, embodiments are not intended to limit this application. By using the method and the technical content disclosed above, any person skilled in the art can make a plurality of possible changes and modifications on the technical solutions of this application, or amend the technical solutions thereof to be embodiments with equal effects through equivalent variations without departing from the technical solutions of this application. Therefore, any amendment, equivalent variation, and modification made on the above embodiments according to the technical essence of this application without departing from the content of the technical solutions of this application shall fall within the protection scope of the technical solutions of this application. The scope of the inventions herein are determined by the claims taken as a whole.

What is claimed is:

1. A photovoltaic system, comprising:
   an inverter;
   at least two converters, an input terminal of each of the at least two converters connected to a corresponding photovoltaic module, and output terminals of the at least two converters connected in series and connected to an input terminal of the inverter; and
   a controller configured to set a voltage limiting value of at least one converter of the at least two converters, so that an output voltage of the at least one converter is less than or equal to a voltage limiting value when the converter works in a voltage limiting mode; and the set voltage limiting value of the at least one converter is proportional to an open circuit voltage of the photovoltaic module connected to the input terminal of the converter.

2. The photovoltaic system according to claim 1, wherein the at least two converters are part of a photovoltaic string; the controller is configured to set the voltage limiting value based on a preset voltage and a sum of open circuit voltages of the photovoltaic string, wherein the preset voltage is less than a maximum allowable input voltage of the inverter; and the set voltage limiting value of the at least one converter is inversely proportional to a sum of open circuit voltages of the photovoltaic string of which the converter is a part.

3. The photovoltaic system according to claim 2, wherein the controller is configured to obtain a limiting proportion of the photovoltaic string by using a ratio of the preset voltage to the sum of open circuit voltages of the photovoltaic string, and at least one converter in the photovoltaic string uses a product of an input voltage of the converter and the limiting proportion as the voltage limiting value.

4. The photovoltaic system according to claim 3, further comprising a first photovoltaic string comprising a first plurality of converters and a second photovoltaic string comprising a second plurality of converters; and
   the controller is configured to send a limiting proportion of the first photovoltaic string to at least one converter in the first photovoltaic string through power line communication, and send a limiting proportion of the second photovoltaic string to at least one converter in the second photovoltaic string, so that the at least one converter in the first photovoltaic string sets a corresponding voltage limiting value based on the limiting proportion of the first photovoltaic string, and the at least one converter in the second photovoltaic string sets a corresponding voltage limiting value based on the limiting proportion of the second photovoltaic string.

5. The photovoltaic system according to claim 4, wherein the controller is further configured to: when the inverter works abnormally, send a modification coefficient to at least one converter in each photovoltaic string in a multicast manner, wherein the modification coefficient is used for reducing the voltage limiting value, and the modification coefficient is less than 1.

6. The photovoltaic system according to claim 4, wherein the controller is configured to obtain the sum of open circuit voltages of each photovoltaic string based on a voltage ratio of the plurality of photovoltaic strings and an output voltage of each photovoltaic string; or the controller is specifically configured to obtain the sum of open circuit voltages of each photovoltaic string based on an open circuit voltage reported by a converter in said photovoltaic string.

7. The photovoltaic system according to claim 6, wherein the controller is specifically configured to send the voltage ratio and the limiting proportion to the corresponding photovoltaic string in a multicast manner.

8. The photovoltaic system according to claim 4, wherein the first photovoltaic string comprises at least a first group of photovoltaic modules and a second group of photovoltaic modules, and the second photovoltaic string comprises at least a third group of photovoltaic modules and a fourth group of photovoltaic modules;
   parameters of the first group of photovoltaic modules being different from parameters of the second group of photovoltaic modules; and
   parameters of the third group of photovoltaic modules being different from parameters of the fourth group of photovoltaic modules.

9. The photovoltaic system according to a claim 4, wherein the plurality of photovoltaic strings comprise at least the first photovoltaic string and the second photovoltaic string; and
   a quantity of photovoltaic modules comprised in the first photovoltaic string and a quantity of photovoltaic modules comprised in the second photovoltaic string are different.

10. The photovoltaic system according to claim 1, wherein the converter comprises a buck circuit; and
    the controller is configured to obtain an output PV curve of the converter based on a PV curve of the connected photovoltaic module and a corresponding voltage limiting value, and control an output voltage of the converter based on the output PV curve.

11. The photovoltaic system according to claim 1, wherein the controller is integrated into a cabinet of the inverter.

12. In a photovoltaic system comprising an inverter, a controller, and a photovoltaic string corresponding to at least two converters, output terminals of the at least two converters being connected in series and connected to an input terminal of the inverter, and an input terminal of each of the at least two converters being connected to a corresponding photovoltaic module;

a photovoltaic system control method comprising:
setting a voltage limiting value of at least one corresponding converter of the at least two converters, so that an output voltage of the at least one converter is less than or equal to the voltage limiting value when the converter works in a voltage limiting mode, wherein the voltage limiting value of the at least one converter is proportional to an open circuit voltage of a photovoltaic module connected to an input terminal of the converter, and is inversely proportional to a sum of open circuit voltages of the photovoltaic string in which the converter is located.

13. The control method according to claim 12, wherein the photovoltaic string comprises the at least two converters; and the setting a voltage limiting value of at least one corresponding converter of the at least two converters comprises:
setting the voltage limiting value based on a preset voltage and a sum of open circuit voltages of the photovoltaic string, wherein the preset voltage is less than a maximum allowable input voltage of the inverter.

14. The control method according to claim 13, wherein the setting the voltage limiting value based on a preset voltage and a sum of open circuit voltages of the photovoltaic string comprises:
obtaining a limiting proportion of the photovoltaic string by using a ratio of the preset voltage to the sum of open circuit voltages of the photovoltaic string, so that at least one converter in the photovoltaic string uses a product of an input voltage of the converter and the limiting proportion as the voltage limiting value.

15. The control method according to claim 14, wherein the photovoltaic system comprises first and second photovoltaic strings, the first photovoltaic string comprising a first plurality of converters, the second photovoltaic string comprising a second plurality of converters, and the method comprises obtaining a limiting proportion of each photovoltaic string based on the preset voltage and the sum of open circuit voltages of each photovoltaic string and further comprises at least one converter in each photovoltaic string setting the voltage limiting value based on the limiting proportion of at least one converter in each photovoltaic string by: sending a limiting proportion of the first photovoltaic string to at least one converter in the first photovoltaic string through power line communication, and sending a limiting proportion of the second photovoltaic string to at least one converter in the second photovoltaic string, so that the at least one converter in the first photovoltaic string sets a corresponding voltage limiting value based on the limiting proportion of the first photovoltaic string, and the at least one converter in the second photovoltaic string sets a corresponding voltage limiting value based on the limiting proportion of the second photovoltaic string.

16. The control method according to claim 15, further comprising: when the inverter works abnormally, sending a modification coefficient to at least one converter in each photovoltaic string in a multicast manner, wherein the modification coefficient is used for reducing the voltage limiting value, and the modification coefficient is less than 1.

17. The control method according to claim 15, further comprising: obtaining the sum of open circuit voltages of each photovoltaic string based on a voltage ratio of the plurality of photovoltaic strings and an output voltage of each photovoltaic string.

18. The control method according to claim 15, further comprising: obtaining the sum of open circuit voltages of each photovoltaic string based on an open circuit voltage reported by a converter in the said photovoltaic string.

19. A method comprising:
with a control circuit, setting a voltage limiting value of a first photovoltaic converter to configure the first photovoltaic converter to produce an output voltage less than or equal to a voltage limiting value the converter uses when it works in a voltage limiting mode,
the control circuit setting the voltage limiting value to be proportional to an open circuit voltage of a photovoltaic module connected to an input terminal of the first photovoltaic converter, and inversely proportional to a sum of open circuit voltages of a photovoltaic array to which the first photovoltaic converter is connected.

* * * * *